United States Patent
Watanabe

(10) Patent No.: US 11,052,449 B2
(45) Date of Patent: Jul. 6, 2021

(54) METHOD FOR MANUFACTURING GRID-STIFFENED STRUCTURE AND GRID-STIFFENED STRUCTURE

(71) Applicant: ShinMaywa Industries, Ltd., Hyogo (JP)

(72) Inventor: Shin Watanabe, Hyogo (JP)

(73) Assignee: ShinMaywa Industries, Ltd., Hyogo (JP)

( * ) Notice: Subject to any disclaimer, the term of this patent is extended or adjusted under 35 U.S.C. 154(b) by 74 days.

(21) Appl. No.: 16/488,579

(22) PCT Filed: Mar. 5, 2018

(86) PCT No.: PCT/JP2018/008422
§ 371 (c)(1),
(2) Date: Aug. 24, 2019

(87) PCT Pub. No.: WO2018/168555
PCT Pub. Date: Sep. 20, 2018

(65) Prior Publication Data
US 2020/0009639 A1    Jan. 9, 2020

(30) Foreign Application Priority Data

Mar. 14, 2017 (JP) .............................. JP2017-049071

(51) Int. Cl.
*B21D 47/04*    (2006.01)
*B29C 53/04*    (2006.01)
(Continued)

(52) U.S. Cl.
CPC .............. *B21D 47/04* (2013.01); *B29C 53/04* (2013.01); *B29C 53/066* (2013.01); *B29C 65/48* (2013.01); *B29C 66/431* (2013.01); *B29C 70/06* (2013.01)

(58) Field of Classification Search
None
See application file for complete search history.

(56) References Cited

U.S. PATENT DOCUMENTS

| | | | | |
|---|---|---|---|---|
| 2,960,197 A | * | 11/1960 | Langhans | B21D 47/00 428/116 |
| 10,835,977 B1 | * | 11/2020 | Kovnat | B23K 1/0008 |
| 2016/0375613 A1 | * | 12/2016 | Schroeder | B29C 53/28 264/157 |

FOREIGN PATENT DOCUMENTS

| | | | | |
|---|---|---|---|---|
| CA | 2413089 A1 | | 12/2001 | |
| EP | 3372323 A1 | * | 9/2018 | ............. B21D 11/20 |

(Continued)

OTHER PUBLICATIONS

International Search Report for corresponding Application No. PCT/JP2018/008422, dated Apr. 3, 2018.

*Primary Examiner* — Barbara J Musser
(74) *Attorney, Agent, or Firm* — Renner, Otto, Boisselle & Sklar, LLP

(57) ABSTRACT

A method for manufacturing a grid-stiffened structure includes: regularly arranging triangular or quadrangular cells on one surface of a sheet member and setting a lattice-like pattern which is provided with rib configuring regions, each of the rib configuring regions being provided between the cells; providing through-holes in positions in the sheet member, where the rib configuring regions intersect, so as to separate the rib configuring regions; forming ribs which protrude from the one surface of the sheet member by folding the rib configuring regions of the sheet member; and mutually connecting ends of the rib in a position of each of the through-holes.

18 Claims, 22 Drawing Sheets

(51) Int. Cl.
   *B29C 65/48* (2006.01)
   *B29C 65/00* (2006.01)
   *B29C 70/06* (2006.01)
   *B29C 53/06* (2006.01)

(56) References Cited

FOREIGN PATENT DOCUMENTS

| | | | |
   |---|---|---|---|
   | JP | 2004-503452 A | 2/2004 | |
   | JP | 2015-127121 A | 7/2015 | |
   | WO | WO-2017078555 A1 * | 5/2017 | ............. B21D 11/20 |

* cited by examiner

FIG.2
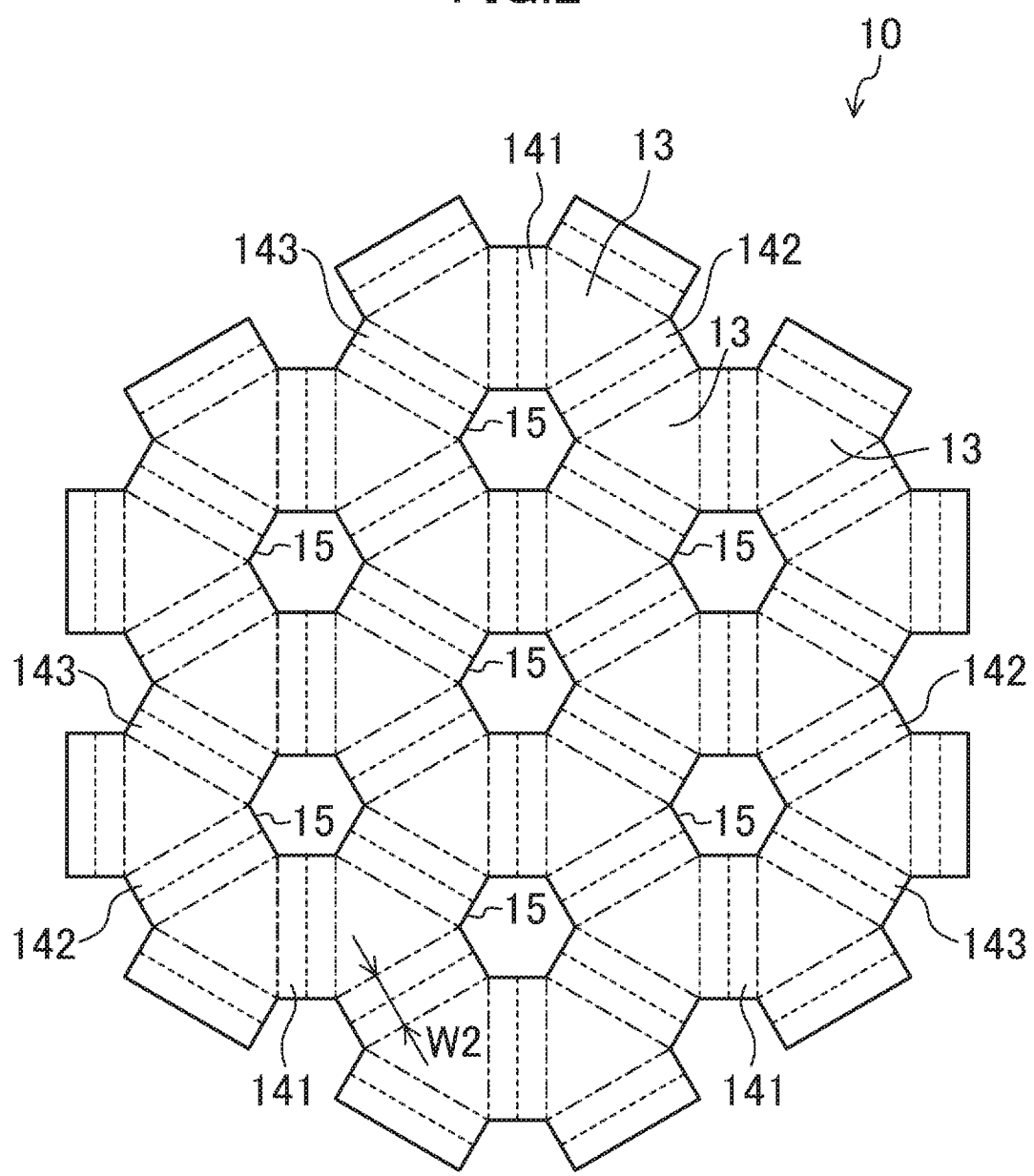
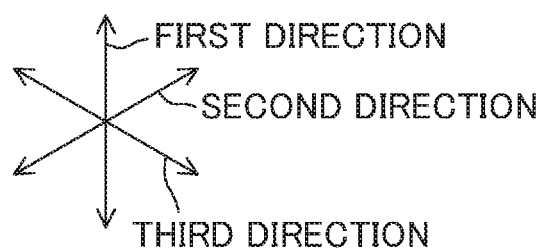

FIG.8
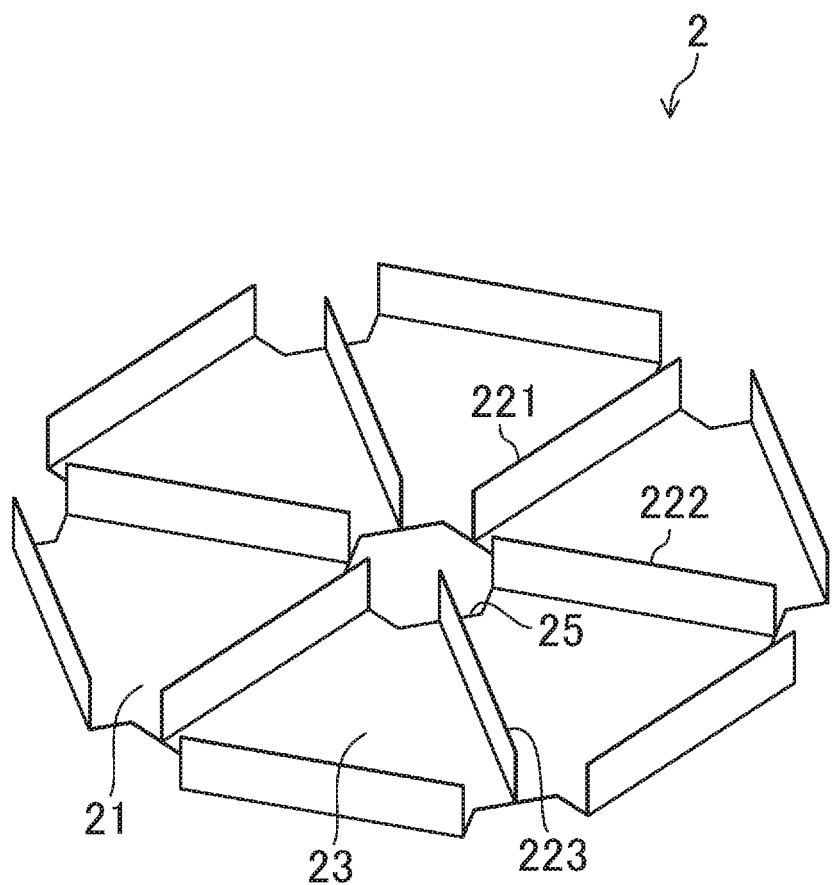
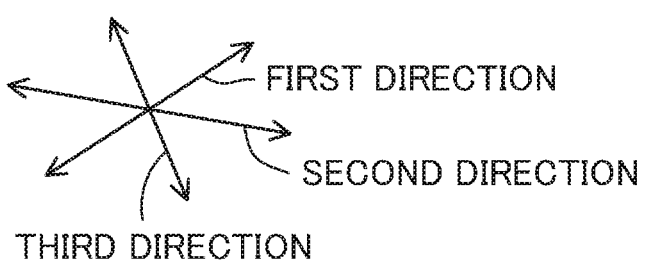

FIG.9
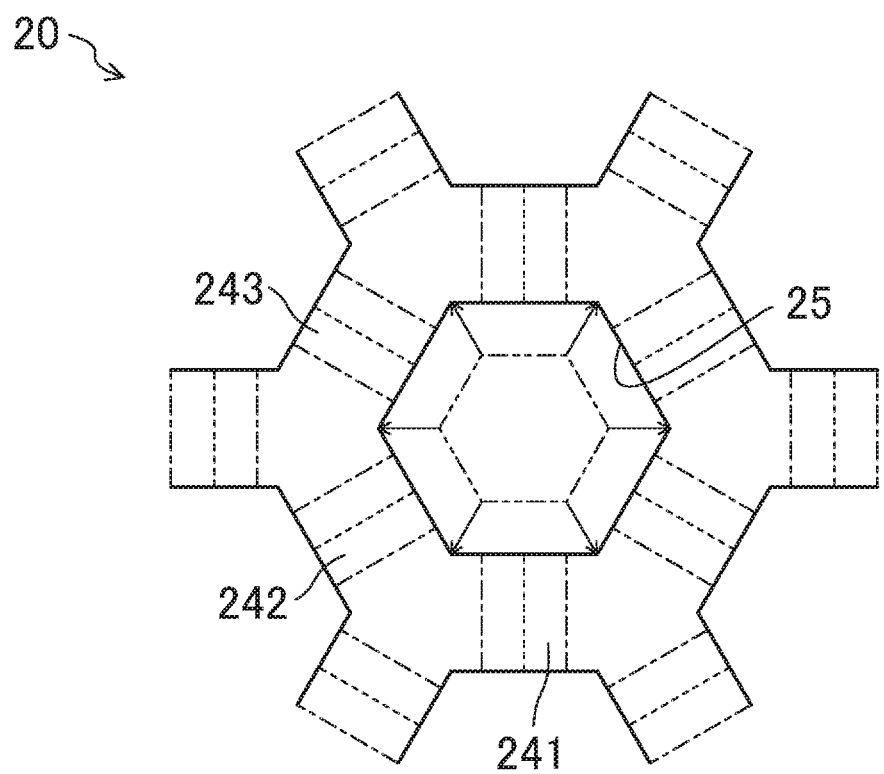
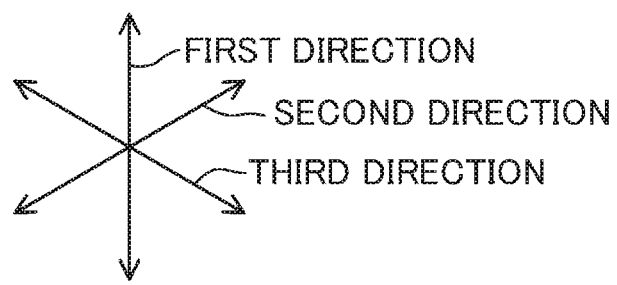

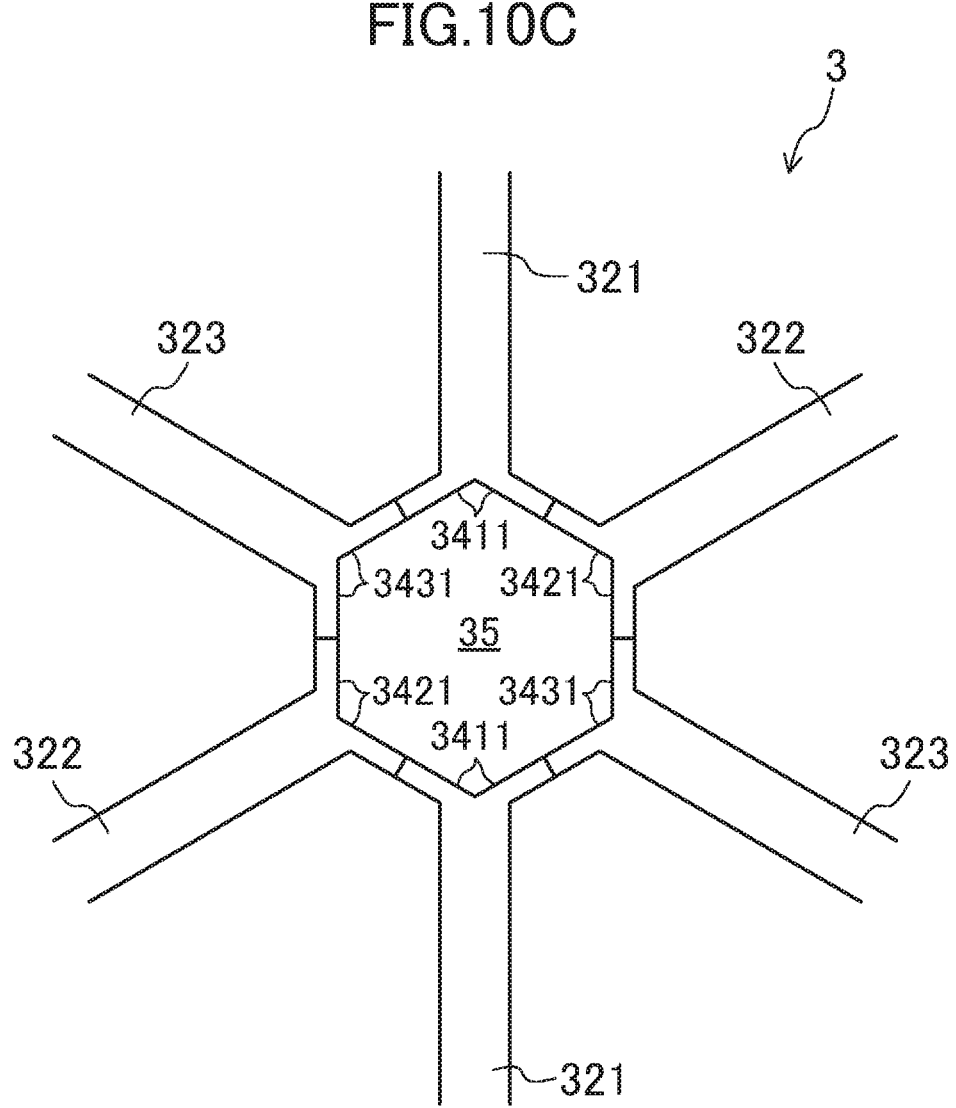

FIG.11
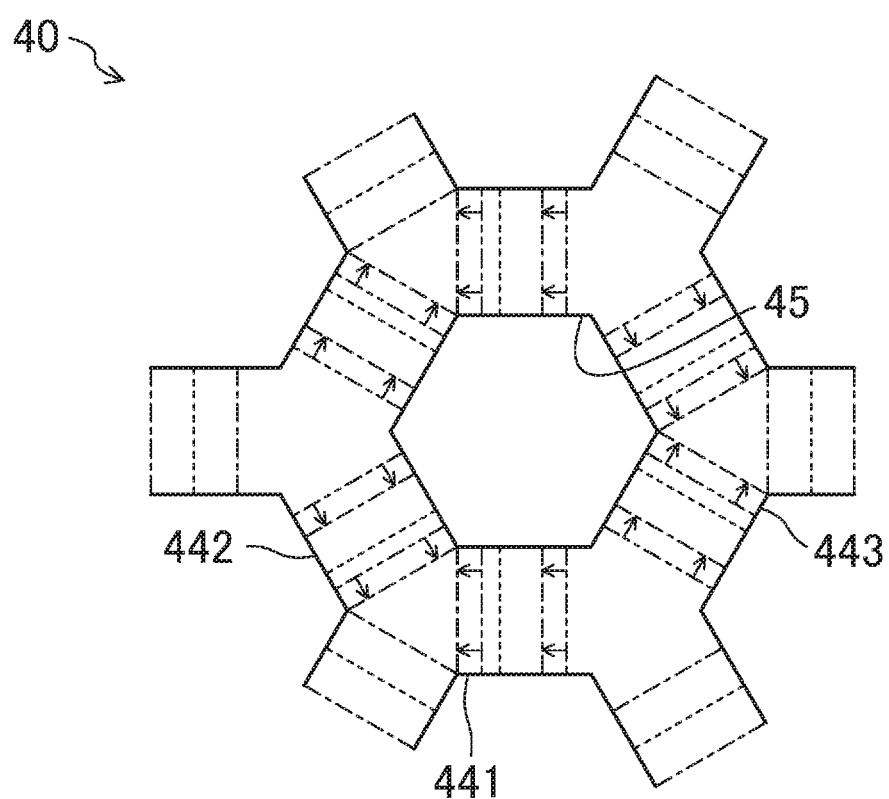
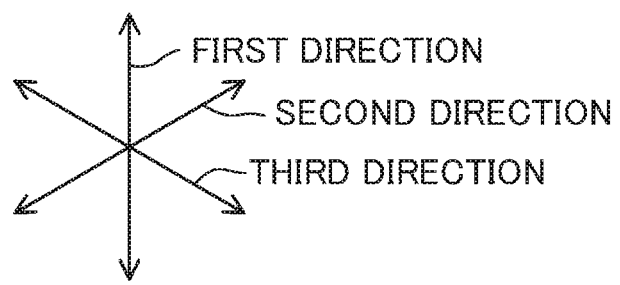

FIG.12
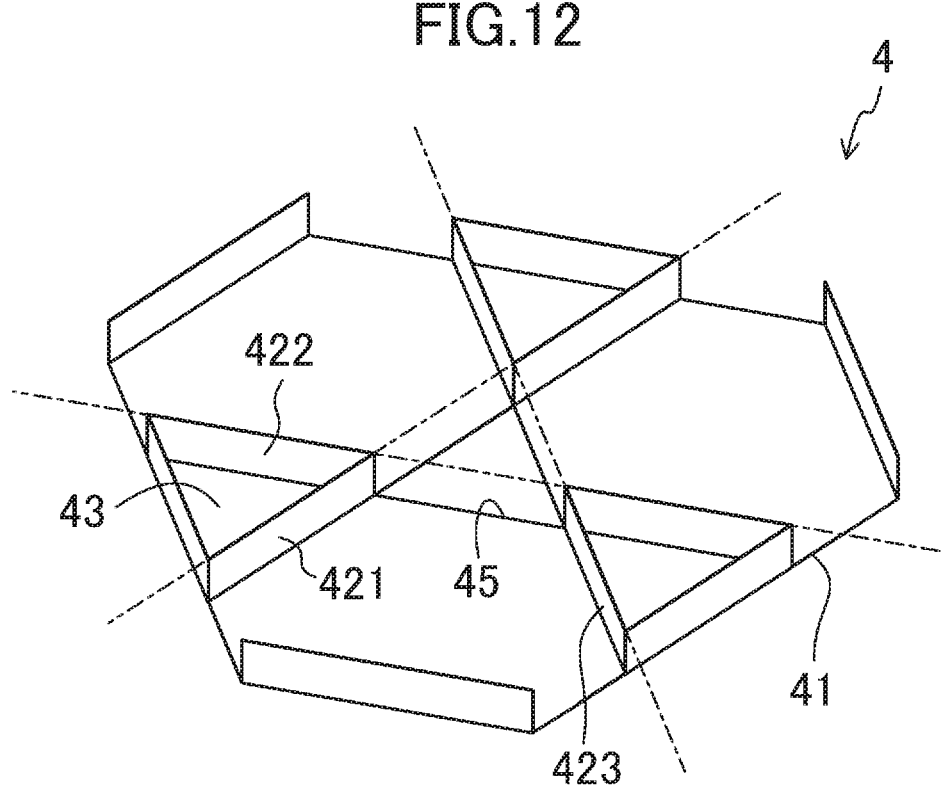
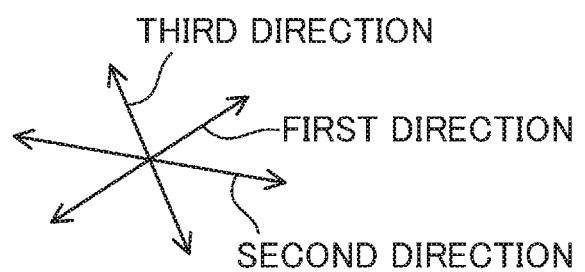

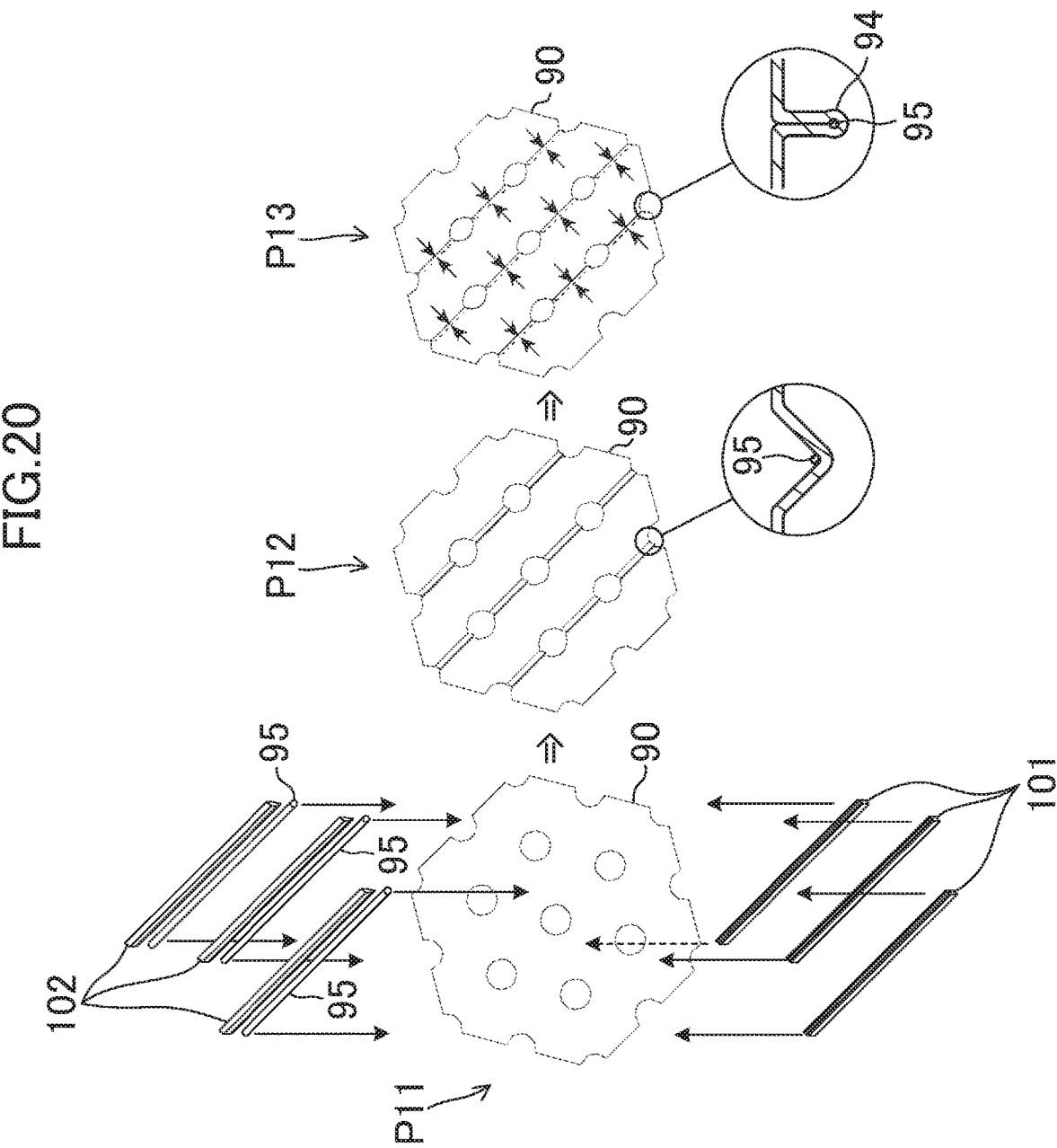

METHOD FOR MANUFACTURING GRID-STIFFENED STRUCTURE AND GRID-STIFFENED STRUCTURE

TECHNICAL FIELD

The technology disclosed herein relates to a method for manufacturing a grid-stiffened structure and a grid-stiffened structure. As the grid-stiffened structure, an isogrid structure or an orthogrid structure is included.

BACKGROUND ART

In PATENT DOCUMENT 1, a method for manufacturing an isogrid structure is described. In the manufacturing method described in PATENT DOCUMENT 1, by using a mold which is provided with lattice-like grooves on a surface thereof, layers of fibers subjected to impregnation processing with resin are placed in the grooves of the mold. Thus, lattice-like ribs in the isogrid structure are formed. The lattice-like ribs are subjected to curing processing and thereafter, by attaching an outer panel to the lattice-like ribs, the isogrid structure having the outer panel and the ribs integrated therein is completed.

In PATENT DOCUMENT 2, a method for manufacturing an isogrid structure which is different from the method in PATENT DOCUMENT 1 is described. In the manufacturing method described in PATENT DOCUMENT 2, first, a tube whose cross section is square-shaped is manufactured of a fiber-reinforced resin, and the tube is cut into tube pieces each having a predetermined width. On a surface of an outer panel, a multitude of the cut tube pieces are arranged such that outer surfaces of the tube pieces face each other. Thus, the plurality of tube pieces constitute lattice-like ribs. Thus, spaces between the outer panel and the plurality of tube pieces are bonded with a thermoplastic resin, and an isogrid structure having the outer panel and the ribs integrated therein is completed.

In addition, for example, a method in which an isogrid structure formed of metal such as an aluminum alloy is manufactured by cutting work has been conventionally known. In other words, in this manufacturing method, a metal plate having a plate thickness which corresponds to a height of each rib is whittled until the metal plate becomes a thin plate with rib portions left, thereby forming lattice-like ribs integrated with an outer panel.

CITATION LIST

Patent Document

PATENT DOCUMENT 1: Japanese Unexamined Patent Publication No. 2004-503452
PATENT DOCUMENT 2: Japanese Unexamined Patent Publication No. 2015-127121

SUMMARY OF THE INVENTION

Technical Problem

In the method for manufacturing the isogrid structure described in PATENT DOCUMENT 1, it is required to place the layers one by one in the grooves of the mold formed in the lattice-like shape. Therefore, it takes a long time to manufacture the isogrid structure.

Similarly, in the method for manufacturing the isogrid structure described in PATENT DOCUMENT 2, the size of the tube to be molded needs to correspond to the height and the number of ribs. Moreover, the molded tube needs to be cut into tube pieces and the multitude of cut tube pieces need to be arranged on the surface of the outer panel. Since the number of processes in this manufacturing method is large, it takes a long time to manufacture the isogrid structure.

In addition, also in the method for manufacturing the isogrid structure by subjecting the metal plate to the cutting work, since it is required to whittle a large part of the metal plate, it takes a long time to manufacture the isogrid structure.

Accordingly, each of the conventional methods for manufacturing the grid-stiffened structures poses a problem in that manufacturing costs increase.

Further, in each of the methods for manufacturing the isogrid structures described in PATENT DOCUMENT 1 and PATENT DOCUMENT 2, the lattice-like ribs and the outer panel are separately molded and thereafter, both of the lattice-like ribs and the outer panel are joined to be thereby integrated. In each of the methods for manufacturing the isogrid structures, although the isogrid structure is manufactured by a fiber-reinforced resin composite material, the fibers are not continuous between the outer panel and the ribs. Each of the methods in which the isogrid structure is manufactured by joining the ribs and the outer panel also poses a problem in that an isogrid structure manufactured by such methods cannot take advantage of the characteristics of the fiber-reinforced resin composite material.

The technique disclosed herein allows a grid-stiffened structure to be manufactured at low costs. As the grid-stiffened structure, an isogrid structure or an orthogrid structure is included.

Solution to the Problem

Specifically, the technique disclosed herein relates to a method for manufacturing the grid-stiffened structure having triangular or quadrangular lattice-like ribs provided integrally with one surface of an outer panel.

This method for manufacturing the grid-stiffened structure includes: regularly arranging triangular or quadrangular cells on one surface of a sheet member constituting the outer panel, and setting a lattice-like pattern provided with rib configuring regions for configuring the ribs, each of the rib configuring regions being configured between the cells; providing, in positions where the rib configuring regions of the sheet member intersect, through-holes so as to separate the rib configuring regions; forming the ribs protruding from the one surface of the sheet member by folding the rib configuring regions of the sheet member; and mutually connecting ends of the rib in a position of each of the through-holes.

By employing this manufacturing method, the grid-stiffened structure is manufactured by folding the sheet member. Unlike the conventional manufacturing method, the grid-stiffened structure can be manufactured in a short period of time.

More particularly, in this manufacturing method, the lattice-like pattern is set on the one surface of the sheet member. The pattern includes the cells and the rib configuring region. The cells constitute portions other than the ribs in the grid-stiffened structure. A shape of each of the cells may be triangular or quadrangular.

Each of the rib configuring regions is located between the cells regularly arranged. The rib configuring regions extend straight in each of a plurality of predetermined directions on the one surface of the sheet member, thereby forming the triangular or quadrangular lattice.

In the sheet member, the through-holes are provided in the positions where the rib configuring regions of the sheet member intersect. The sheet member may be subjected to processing in which the through-holes are formed in predetermined positions of the sheet member. Alternately, the sheet member may be previously provided with the through-holes in the predetermined positions. The through-holes separate the rib configuring regions extending in the predetermined directions.

After setting the pattern, the rib configuring regions of the sheet member are folded such that at least one portion of each of the rib configuring regions is mountain-folded and two portions of each thereof, between which the mountain-folded portion is sandwiched, are valley-folded. Thus, the ribs which protrude from the one surface of the sheet member are formed. Among the rib configuring regions set in the sheet member, the rib configuring regions which extend in the same direction can be simultaneously folded. Since the plurality of ribs can be formed at once, a working time is shortened.

The rib configuring regions are separated by the through-holes in the positions where the rib configuring regions intersect. Therefore, the plurality of ribs extending in one of the directions are formed by folding the plurality of rib configuring regions extending in one of the directions, and thereafter, the rib configuring regions extending in another direction can be folded without interference by the previously formed ribs. Thus, the plurality of ribs extending in the other of the directions can be formed.

The ribs formed on the sheet member are separated and are not continuous in the positions of the through-holes. The ends of each of the ribs which are separated in the positions of the through-holes are mutually connected, thereby making the ribs continuous. The ribs are made continuous, thereby enhancing the strength of the grid-stiffened structure.

In this manufacturing method, one sheet member is folded in at least two directions, thereby allowing the lattice-like ribs to integrate with the outer panel to be formed. A manufacturing time of the grid-stiffened structure is shortened, and manufacturing costs of the grid-stiffened structure are reduced.

The above-described manufacturing method may include forming a shape of an opening edge of each of the through-holes into a predetermined shape to provide, when forming the ribs by folding the rib configuring regions, extending parts protruding from the ends of the ribs toward a center of each of the through-holes, the extending parts being provided integrally with the ribs, and connecting the extending parts of the ribs adjacent to each other in the position of each of the through-holes to connect the ends of the ribs to each other.

Thus, the ribs and the extending parts can be formed by folding the sheet member, and the ribs which are separated by the through-holes can be easily connected.

The manufacturing method may further include attaching a reinforcement member in a position on another surface of the outer panel, where each of the ribs is formed.

The reinforcement member is attached to the position on the other surface of the outer panel, where each of the ribs is formed, thereby stabilizing a shape of each of the ribs formed by folding the sheet member. The strength of each of the ribs is enhanced, and as a result, the strength of the grid-stiffened structure is enhanced.

Each of the ribs may be configured by folding the sheet member such that one portion and one portion of another surface of the sheet member contact each other, and the method may further include causing the portions of the other surface of the sheet member to adhere to each other by an adhesive in a position where each of the ribs is formed, the portions of the other surface of the sheet member being in contact with each other.

In this way, since the strength of each of the ribs can be enhanced, the strength of the grid-stiffened structure can be enhanced.

Instead of the above-mentioned causing the portions of the other surface of the sheet member to adhere to each other, the manufacturing method may further include joining the portions of the other surface of the sheet member by welding in the position where each of the ribs is formed, the portions of the other surface of the sheet member being in contact with each other.

Also in this way, since the strength of each of the ribs can be enhanced, the strength of the grid-stiffened structure can be enhanced.

Upon folding each of the rib configuring regions, the method may further include sandwiching between the portions of the sheet member a member whose cross section is circular.

In this way, in a top portion of each of the ribs, the member whose cross-section is circular is embedded. Hence, the top portion of each thereof can be easily round-shaped.

In the sheet member, the cells may be triangular, the configuring regions set in the sheet member may include rib configuring regions which extend in a first direction, rib configuring regions which extend in a second direction, and rib configuring regions which extend in a third direction, and a position where each of the rib configuring regions extending in the first direction and each of the rib configuring regions extending in the second direction intersect, a position where each of the rib configuring regions extending in the second direction and each of the rib configuring regions extending in the third direction intersect, and a position where each of the rib configuring regions extending in the third direction and each of the rib configuring regions extending in the first direction intersect may be shifted from one another.

In this way, in the grid-stiffened structure completed by folding the sheet member, a position where each of the ribs formed by folding the rib configuring regions extending in the first direction and each of the ribs formed by folding the rib configuring regions extending in the second direction intersect, a position where each of the ribs formed by folding the rib configuring regions extending in the second direction and each of the ribs formed by folding the rib configuring regions extending in the third direction intersect, and a position where each of the ribs formed by folding the rib configuring regions extending in the third direction and each of the ribs formed by folding the rib configuring regions extending in the first direction intersect are shifted from one another. As a result, it is made possible to suppress stress concentration in the grid-stiffened structure.

The sheet member may be made of a fiber-reinforced thermoplastic resin composite material.

In the method for manufacturing the grid-stiffened structure, since the ribs are formed by folding the sheet member, fibers of the fiber-reinforced thermoplastic resin composite material are disposed so as to be continuous between the outer panel and the ribs. Accordingly, as compared with the conventional manufacturing method, it is made possible to manufacture the grid-stiffened structure having a further high strength in a short period of time.

The sheet member may be made of a fiber-reinforced thermosetting resin composite material.

In the method for manufacturing the grid-stiffened structure, since the ribs are formed by folding the sheet member, fibers of the fiber-reinforced thermosetting resin composite material are disposed so as to be continuous between the outer panel and the ribs. Accordingly, as compare with the conventional manufacturing method, it is made possible to manufacture the grid-stiffened structure having a further high strength in a short period of time.

In the grid-stiffened structure disclosed herein, the outer panel and the ribs are configured by the folded one continuous sheet member, and in the sheet member, the through-holes, each of which separates each of the ribs, are formed in the positions where the ribs mutually intersect.

ADVANTAGES OF THE INVENTION

As described above, by employing the above-described method for manufacturing the grid-stiffened structure, the grid-stiffened structure can be manufactured at low costs.

BRIEF DESCRIPTION OF THE DRAWINGS

FIG. 2 is a plan view illustrating a sheet member used for manufacturing the grid-stiffened structure.

FIG. 8 is a perspective view illustrating one part of a grid-stiffened structure having a configuration which is different from a configuration of the grid-stiffened structure illustrated in FIG. 1.

FIG. 9 is a plan view illustrating one part of a sheet member used for manufacturing the grid-stiffened structure illustrated in FIG. 8.

FIG. 10C is a plan view illustrating the grid-stiffened structure illustrated in FIG. 10B with extending parts of the neighboring ribs joined together.

FIG. 11 is a plan view illustrating one part of a sheet member in which positions of rib configuring regions are shifted, as compared with those in the sheet member shown in FIG. 9.

FIG. 12 is a diagram corresponding to FIG. 8, and illustrating a grid-stiffened structure manufactured of the sheet member shown in FIG. 11.

FIG. 20 is a transition diagram illustrating a procedure of manufacturing the rib shown in FIG. 19C.

DESCRIPTION OF EMBODIMENT

Hereinafter, with reference to the accompanying drawings, a grid-stiffened structure and a method for manufacturing the grid-stiffened structure disclosed herein will be described. Note that the description below is made for exemplification of the grid-stiffened structure and the method for manufacturing the grid-stiffened structure.

Configuration of Grid-Stiffened Structure

Figure 1:
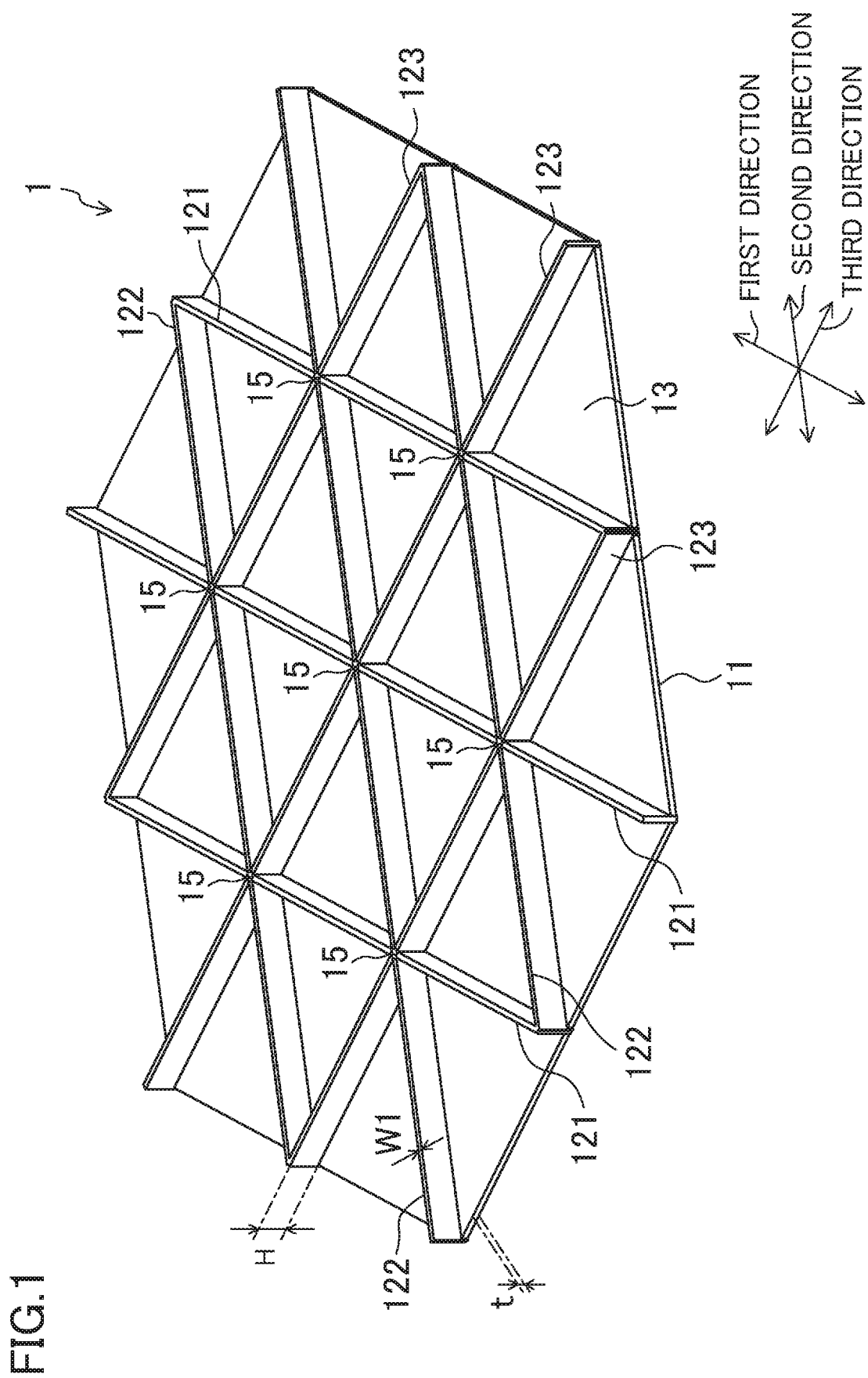
FIG. 1 is a perspective view illustrating a grid-stiffened structure.

FIG. 1 illustrates a grid-stiffened structure 1. The grid-stiffened structure 1 includes an outer panel 11 and ribs 121, 122, and 123 which are provided integrally with the outer panel 11. The grid-stiffened structure 1 is lightweight and has a high strength because of its configuration.

Each of the ribs 121, 122, and 123 is provided so as to protrude from one surface of the outer panel (that is, a surface which can be seen in FIG. 1). The ribs 12 are disposed in a lattice-like manner on the one surface of the outer panel 11. More particularly, as the ribs 121, 122, and 123, a plurality of ribs 121 which extend in a first direction, a plurality of ribs 122 which extend in a second direction, and a plurality of ribs 123 which extend in a third direction are included. The ribs 121, the ribs 122, and the ribs 123 mutually intersect at predetermined positions. Each angle at which these ribs 121, 122, and 123 mutually intersect is approximately 60°.

In the description below, a portion which is enclosed by the rib 121, the rib 122, and the rib 123 is referred to as a cell. In the grid-stiffened structure 1 shown in FIG. 1, the cell 13 is equilateral-triangular. This grid-stiffened structure 1 is also referred to as an isogrid structure.

The grid-stiffened structure 1 can be formed of a variety of materials. The grid-stiffened structure 1 may be formed of, for example, a fiber-reinforced resin composite material. More specifically, the grid-stiffened structure 1 may be formed of a fiber-reinforced thermosetting resin composite material. In addition, the grid-stiffened structure 1 may be formed of a fiber-reinforced thermoplastic resin composite material. The grid-stiffened structure 1 may be formed of a metal material. For example, the grid-stiffened structure 1 may be formed of an aluminum alloy.

The grid-stiffened structure 1 may be shaped into a flat plate as shown in FIG. 1. In addition, the grid-stiffened structure 1 may be shaped into a curved plate through bending work. Further, the grid-stiffened structure 1 may be bent to be of a cylindrical shape and the opposing end edges thereof may be joined together.

Method for Manufacturing Grid-Stiffened Structure

The grid-stiffened structure 1 disclosed herein is manufactured by bending one sheet member 10. Hereinafter, with reference to the accompanying drawings, a manufacturing method therefor will be described.

Configuration of Sheet Member

FIG. 2 illustrates the sheet member 10 used for manufacturing the grid-stiffened structure 1 shown in FIG. 1. The sheet member 10 is formed of a material which can be subjected to plastic working, such as the fiber-reinforced resin composite material and the metal material. The sheet member 10 may be a relatively thin plate. The thickness of the sheet member 10 can be appropriately set in accordance with a thickness t of the outer panel 11 or a width W1 of each of the ribs 121, 122, and 123, the thickness t and the width W1 being required for the grid-stiffened structure 1 (see FIG. 1).

On one surface of the sheet member 10, cells 13 are set to be regularly arranged. In an example in FIG. 2, the cells 13 which are equilateral-triangular, each as indicated by a dot-and-dash line, are substantially densely arranged. The dot-and-dash line in FIG. 2 indicates a line along which the sheet member 10 is valley-folded as described later. The dot-and-dash line is not visually recognizable on the sheet member 10 but is an imaginary line indicated in FIG. 2 in order to facilitate understanding.

On the one surface of the sheet member 10, between the cells 13 adjacent to each other, rib configuring regions 141, 142, and 143 are set. Each of the rib configuring regions 141, 142, and 143 is a region which is sandwiched between dot-and-dash lines in parallel with each other. The rib configuring regions 141, 142, and 143 are regions for configuring the ribs 121, 122, and 123 in the grid-stiffened structure 1 as described later. Of the rib configuring regions 141, 142, and 143 illustrated in FIG. 2, the rib configuring region 141 extends straight in a first direction, the rib configuring region 142 extends straight in a second direction, and the rib configuring region 143 extends straight in a third direction. These rib configuring regions 141, 142, and 143 constitute an equilateral-triangular lattice. The numbers of the rib configuring regions 141, 142, and 143 are set in accordance with the numbers of the ribs 121, 122, and 123 provided in the grid-stiffened structure 1.

A width W2 of each of the rib configuring regions 141, 142, and 143 can be set in accordance with a height H of each of the ribs 121, 122, and 123 in the grid-stiffened structure 1 (see FIG. 1). As described later, when the width W2 of each of the rib configuring regions 141, 142, and 143 is made large, the height H of each of the ribs 121, 122, and 123 in the grid-stiffened structure becomes large, and when the width W2 of each of the rib configuring regions 141, 142, and 143 is made small, the height H of each of the ribs 121, 122, and 123 in the grid-stiffened structure becomes small. A broken line in the center of each of the rib configuring regions 141, 142, and 143 indicates a line along which the sheet member 10 is mountain-folded as described later. As with the dot-and-dash line, this broken line is not visually recognizable either in the sheet member 10 but is an imaginary line indicated in FIG. 2 in order to facilitate understanding.

In the sheet member 10, at positions at which the rib configuring regions 141, 142, and 143 mutually intersect, through-holes 15 are formed. In the example shown in FIG. 2, each of the through-holes 15 is of a regular hexagon. Each of the sides of the regular hexagon is the width W2 of a corresponding one of the rib configuring regions 141, 142, and 143. The rib configuring regions 141, 142, and 143 which extend respectively in the first, second, and third directions are separated by the through-holes 15. However, in the example shown in FIG. 2, ends of the neighboring rib configuring regions 141, 142, and 143 in a circumferential direction with the through-holes 15 as the center contact each other, respectively.

Note that a shape of a circumferential portion of the sheet member 10 is not limited to a shape shown in FIG. 2. The shape of the circumferential portion of the sheet member 10 can be made to be of an appropriate shape. For example, no rib configuring regions 141, 142, and 143 in the circumferential portion of the sheet member 10 may be provided. Only some of the rib configuring regions 141, 142, and 143 may be left in the circumferential portion of the sheet member 10.

Folding Work of Sheet Member

Figure 3:
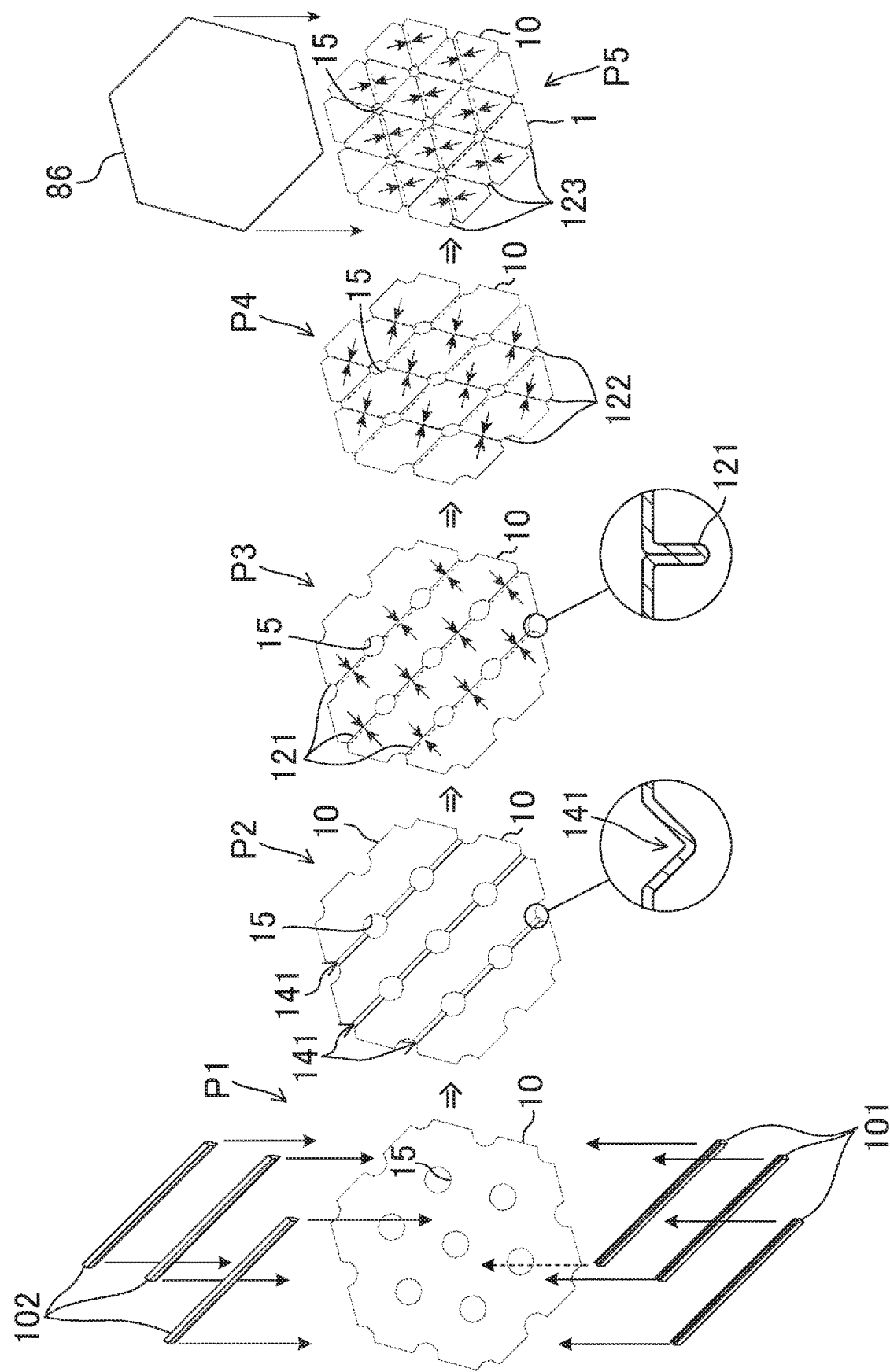
FIG. 3 is a transition diagram illustrating a procedure of manufacturing the grid-stiffened structure.

FIG. 3 shows a procedure of manufacturing the grid-stiffened structure 1 from the sheet member 10 illustrated in FIG. 2. In the initial procedure, the sheet member 10 is prepared. In the sheet member 10, at the predetermined positions, the through-holes 15 are formed. The sheet member 10 may be subjected to processing in which the through-holes 15 are formed therein or a sheet member 10 in which the through-holes 15 are previously provided may be prepared.

In the sheet member 10, by folding the rib configuring regions 141 which extend in the first direction, the ribs 121 which extend in the first direction are formed (processes P1 to P3). For folding the sheet member 10, as shown in the process P1, a forming mold which includes female molds 101 and male molds 102 is used. Each of the female molds 101 and the male molds 102 is of a rod-shape which extends in a predetermined direction. The female molds 101 are disposed on one surface of the sheet member 10 and the male molds 102 are disposed on another surface of the sheet member 10, and the rib configuring regions 141 of the sheet member 10 are sandwiched between the female molds 101 and the male molds 102 in a thickness direction of the sheet member. Thus, a central portion (the portion indicated by the broken line in FIG. 2) of each of the rib configuring regions 141 is mountain-folded, and both sides (the portions indicated by the dot-and-dash lines in FIG. 2) between which the central portion thereof is sandwiched are valley-folded. Note that in FIG. 3, the sheet member 10 are shown the other way around in relation to the grid-stiffened structure 1 shown in FIG. 1 and FIG. 2. In this way, as shown in the process P2, the sheet member 10 is folded such that a cross-section thereof is V-shaped. At this time, as shown in the process P1, a plurality of forming molds, each of which includes the female molds 101 and male molds 102, are used, thereby allowing a plurality of the rib configuring regions 141 extending in the first direction to be simultaneously folded.

As shown in the process P3, the rib configuring regions 141 are further folded until portions, on the other surface of the sheet member 10, of each of the rib configuring regions 141 folded in the V-shape come into contact with each other. Thus, the ribs 121 which protrude from the one surface of the sheet member 10 are formed. The ribs 121 extend in the first direction and are separated at the positions of the through-holes 15. By forming the ribs 121, the sheet member 10 contracts in a direction which is orthogonal to the first direction (see arrows in FIG. 3).

Next, a direction in which the forming mold including the female molds 101 and male molds 102 is disposed is changed or a direction in which the sheet member 10 is disposed is changed, and the ribs 122 which extend in the second direction are formed (a process P4). Although the detailed illustration is omitted, the ribs 122 are also formed in the above-described procedure. The female molds 101 disposed on the one surface of the sheet member 10 and the male molds 102 disposed on the other surface of the sheet member 10 are used, and the rib configuring regions 142 of the sheet member 10 which extend in the second direction are sandwiched therebetween in the thickness direction of the sheet member 10. In this way, the sheet member 10 is folded such that the cross-section of each of the rib configuring regions 142 is V-shaped. At this time, since the ribs 121 first formed in the sheet member 10 are separated at the positions of the through-holes 15, without interference by the ribs 121, the rib configuring regions 142 extending in the second direction can be folded. Thereafter, in the folded rib configuring regions 142, the V-shaped rib configuring regions 142 are further folded such that portions, on the other surface of the sheet member 10, of each of the rib configuring regions 142 folded in the V-shape come into contact with each other. Thus, the ribs 122 which protrude from the one surface of the sheet member 10 are formed. The ribs 122 extending in the second direction are also separated at the positions of the through-holes 15.

After forming the ribs 122 extending in the second direction, again the direction in which the forming mold including the female molds 101 and male molds 102 is disposed is changed or the direction in which the sheet member 10 is disposed is changed, and the ribs 123 which extend in the third direction are formed (a process P5). The ribs 123 extending in the third direction are also formed in the above-described procedure. In other words, the female molds 101 disposed on the one surface of the sheet member 10 and the male molds 102 disposed on the other surface of the sheet member 10 are used, and the rib configuring regions 143 of the sheet member 10 which extend in the third direction are sandwiched therebetween in the thickness direction of the sheet member 10, and the sheet member 10 is thereby folded such that a cross-section of each of the rib configuring regions 143 is V-shaped. At this time, since the ribs 121 extending in the first direction and the ribs 122 extending in the second direction which have been first formed in the sheet member 10 are separated at the positions of the through-holes 15, the rib configuring regions 143 extending in the third direction can be folded. Thereafter, in the folded rib configuring regions 143, the V-shaped rib configuring regions 142 are further folded such that portions, on the other surface of the sheet member 10, of each of the rib configuring regions 143 folded in the V-shape come into contact with each other. Thus, the ribs 123 which protrude from the one surface of the sheet member 10 are formed. The ribs 123 extending in the third direction are also separated at the positions of the through-holes 15.

As described above, by folding the one sheet member 10, the ribs 121, 122, and 123 which extend in the first direction, the second direction, and the third direction, respectively can be formed on the sheet member 10. In other words, the lattice-like ribs 121, 122, and 123 are provided integrally with the outer panel 11. At the positions at which the ribs 121, 122, and 123 mutually intersect, the through-holes 15 separating the ribs 121, 122, and 123 are formed (see FIG. 1). Although the detailed illustration is omitted, as described above, since in the sheet member 10, the ends of the neighboring rib configuring regions 141, 142, and 143 in the circumferential direction with the through-holes 15 as the center contact with each other. Hence, in the grid-stiffened structure 1, ends of the neighboring ribs 121, 122, and 123 in the circumferential direction with the through-holes 15 as the center substantially contact with each other.

Although the details will be described later, after that, at positions at which the ribs 121, 122, and 123 mutually intersect, ends of the ribs 121, 122, and 123 are mutually connected, and the grid-stiffened structure 1 is thereby completed.

Note that as shown in the process P5, on the other surface of the outer panel 11, an outer panel 86 (that is, a back plate) may be attached to be laid on the outer panel 11. Thus, the through-holes 15 are covered.

Figure 4:
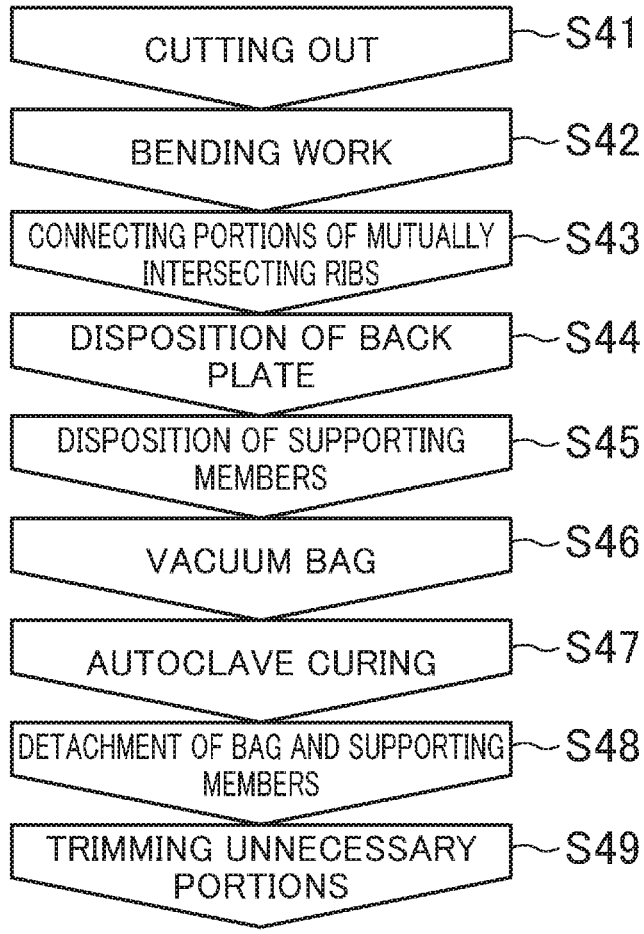
FIG. 4 is a flowchart illustrating a procedure of manufacturing the grid-stiffened structure by using a fiber-reinforced thermosetting resin composite material.

Processes for Manufacturing Grid-Stiffened Structure Formed of Fiber-Reinforced Thermosetting Resin Composite Material Next, with reference to FIG. 4, a procedure for manufacturing the grid-stiffened structure with a fiber-reinforced thermosetting resin composite material will be described. First, in Step S41, a sheet member 10 formed of the fiber-reinforced thermosetting resin composite material is cut out so as to have a predetermined shape. In Step S41, through-holes 15 are also formed at predetermined positions of the sheet member 10. Accordingly, a lattice-like pattern which includes the cells 13 and the rib configuring regions 141, 142, and 143 is set in the sheet member 10 (see FIG. 2).

Although the illustration is omitted, the sheet member 10 may be a sheet-like member obtained, for example, by layering a plurality of fiber layers whose fiber directions are different from one another and impregnating the layered fiber layers with a thermosetting resin as a matrix. Reinforced fibers may be any kind of reinforced fibers such as carbon fibers, glass fibers, and resin fibers. In addition, the thermosetting resin may be any kind of thermosetting resin such as an epoxy resin and an unsaturated polyester resin.

Further, the sheet member 10 may be manufactured by employing any manufacturing method. For example, the sheet member 10 may be manufactured by layering composite tapes (formed of prepreg).

After cutting out the sheet member 10 in the predetermined shape, in the subsequent Step S42, in accordance with the procedure shown in FIG. 3, the sheet member 10 is subjected to bending work. Thus, in the sheet member 10, the lattice-like ribs 121, 122, and 123 are formed.

In the subsequent Step S43, at positions at which the ribs 121, 122, and 123 mutually intersect, ends of each of the ribs 121, 122, and 123 which are separated by the through-holes 15 are connected to each other. The details of the connection of the ribs 121, 122, and 123 will be described later.

In Step S44, on the other surface of the sheet member 10, the back plate (second outer panel 86) is disposed. If the back plate is unnecessary, Step S44 is omitted. If the back plate is formed of the fiber-reinforced resin composite material, in consideration of a direction of fibers of the sheet member 10 and a direction of fibers of the back plate, the back plate is disposed on the other surface of the sheet member 10.

Step S45 to Step S48 relate to a process in which the thermosetting resin is cured. First, in Step S45, upon putting the sheet member 10 into a vacuum bag to perform vacuuming, a supporting member (not shown) is disposed on each side of the ribs 121, 122, and 123 in order to keep the ribs 121, 122, and 123 formed in Step S42 from collapsing.

In the subsequent Step S46, the sheet member 10 having the supporting members disposed therein is put into the bag and vacuuming of an inside of the bag is performed.

In Step S47, the vacuum bag into which the sheet member 10 having the ribs 121, 122, and 123 is put into a not-shown autoclave, and the sheet member 10 is heated. Thus, the thermosetting resin is cured. In addition, the back plate adheres to the other surface of the sheet member 10.

In Step S48, the vacuum bag is taken out from the autoclave, the sheet member 10 having the ribs 121, 122, and 123 is taken out from the vacuum bag, and the above-mentioned supporting members are detached from the sheet member 10.

Then, by trimming unnecessary portions in Step S49, the grid-stiffened structure 1 in which the outer panel 11 and the lattice-like ribs 121, 122, and 123 are integrated and which is formed of the fiber-reinforced thermosetting resin composite material is completed.

As described above, in the method for manufacturing the grid-stiffened structure disclosed herein, since by folding the one sheet member 10, the ribs 121, 122, and 123 extending in the first direction, second direction, and third direction, respectively are formed. Hence, when the grid-stiffened structure 1 is formed of the fiber-reinforced thermosetting resin composite material, fibers which are continuous between the outer panel 11 and the ribs 121, 122, and 123 can be disposed. Accordingly, this manufacturing method allows the grid-stiffened structure which makes good use of characteristics of the fiber-reinforced resin composite material to be manufactured, and the grid-stiffened structure 1 manufactured by this manufacturing method is more rigid than a grid-stiffened structure manufactured by the conventional manufacturing method.

Figure 5:
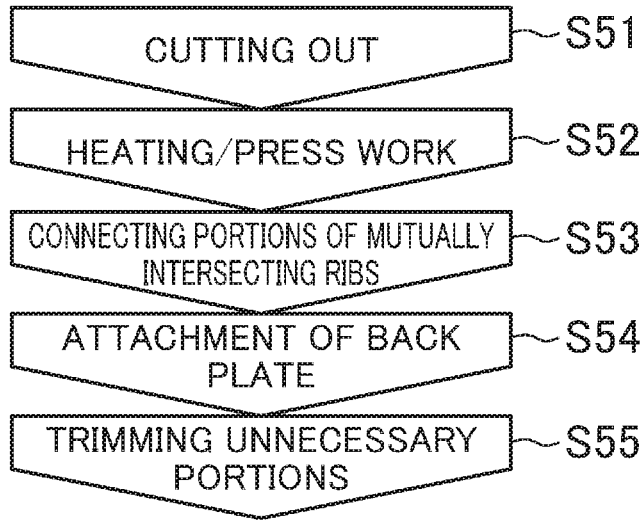
FIG. 5 is a flowchart exemplifying a procedure of manufacturing the grid-stiffened structure by using a fiber-reinforced thermoplastic resin composite material.

Processes for Manufacturing Grid-Stiffened Structure Formed of Fiber-Reinforced Thermoplastic Resin Composite Material Next, with reference to FIG. 5, a procedure for manufacturing the grid-stiffened structure with a fiber-reinforced thermoplastic resin composite material will be described. Step S51 is substantially the same as Step S41, and the sheet member 10 formed of the fiber-reinforced thermoplastic resin composite material is cut out so as to have a predetermined shape. In Step S51, through-holes 15 are also formed at predetermined positions of the sheet member 10. Accordingly, a lattice-like pattern which includes the cells 13 and the rib configuring regions 141, 142, and 143 is set in the sheet member 10 (see FIG. 2).

The sheet member 10 formed of the fiber-reinforced thermoplastic resin composite material may also be similar in configuration to the sheet member 10 formed of the fiber-reinforced thermosetting resin composite material. Although the illustration is omitted, the sheet member 10 may be a sheet-like member obtained, for example, by layering a plurality of fiber layers whose fiber directions are different from one another and impregnating the layered fiber layers with a thermoplastic resin as a matrix. Reinforced fibers may be any kind of reinforced fibers such as carbon fibers, glass fibers, and resin fibers. In addition, the thermoplastic resin may be any kind of a thermoplastic resin such as a polypropylene resin and a polyamide resin. Further, the sheet member may be manufactured by employing any manufacturing method. For example, the sheet member 10 may be manufactured by layering composite tapes (formed of prepreg).

After cutting out the sheet member 10 in the predetermined shape, in the subsequent Step S52, in accordance with the procedure shown in FIG. 3, the sheet member 10 is heated and subjected to press work (that is, the bending work). Thus, in the sheet member 10, the ribs 121, 122, and 123 are formed. In addition, when the heated sheet member 10 cools down, the ribs 121, 122, and 123 formed in the sheet member 10 are also cured. As shown in the process P3 in FIG. 3, in the rib configuring regions 141, 142, and 143, the sheet member 10 is folded such that portions, on the other surface of the sheet member 10, of each of the rib configuring regions 141, 142, and 143 come into contact with each other. With the portions joined to each other, the ribs 121, 122, and 123 are cured.

In Step S53, as in the above-described Step S43, at positions at which the ribs 121, 122, and 123 mutually intersect, ends of the ribs 121, 122, and 123 are connected to each other. The details of the connection of the ribs 121, 122, and 123 will be described later.

In Step S54, as in Step S44, on the other surface of the sheet member 10, a back plate (that is, a second outer panel 86) is disposed, and the back plate is attached to the sheet member 10. The sheet member 10 and the back plate may be joined by an appropriate method. If the back plate is unnecessary, Step S54 is omitted.

Finally, by trimming unnecessary portions in Step S55, the grid-stiffened structure 1 in which the outer panel 11 and the lattice-like ribs 121, 122, and 123 are integrated and which is formed of the fiber-reinforced thermoplastic resin composite material is completed.

Also when the grid-stiffened structure 1 is formed of the fiber-reinforced thermoplastic resin composite material, fibers which are continuous between the outer panel 11 and the ribs 121, 122, and 123 can be disposed.

Processes for Manufacturing Grid-Stiffened Structure Formed of Metal Material

Figure 6:
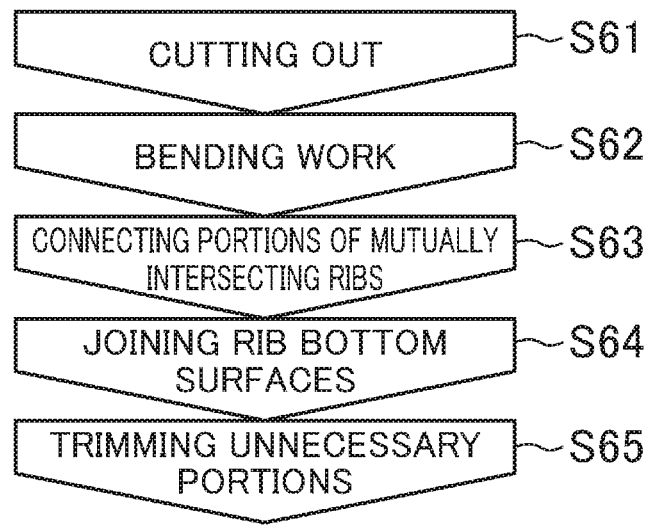
FIG. 6 is a flowchart illustrating a procedure of manufacturing the grid-stiffened structure by using a metal material.

Next, with reference to FIG. 6, a procedure for manufacturing the grid-stiffened structure 1 with a metal material (for example, an aluminum alloy) will be described. Step S61 is substantially the same as Step S41, and the sheet member 10 formed of the metal material is cut out so as to have a predetermined shape. In Step S61, through-holes 15 are also formed at predetermined positions of the sheet member 10. Accordingly, a lattice-like pattern which includes the cells 13 and the rib configuring regions 141, 142, and 143 is set in the sheet member 10 (see FIG. 2). Note that the sheet member 10 can be manufactured by a variety of known manufacturing methods.

After cutting out the sheet member 10 in the predetermined shape, in the subsequent Step S62, the sheet member 10 is subjected to bending work in accordance with the procedure shown in FIG. 3. Thus, in the sheet member 10, the ribs 121, 122, and 123 are integrally formed.

In Step S63, as in the above-described Step S43, at positions at which the ribs 121, 122, and 123 mutually intersect, ends of the ribs 121, 122, and 123 are connected to each other. The details of the connection of the ribs 121, 122, and 123 will be described later.

In Step S64, at a position on the other surface of the sheet member 10, where each of the ribs 121, 122, and 123 is formed, neighboring portions of the sheet member 10 are joined together with each of the ribs 121, 122, and 123 provided therebetween. A method of joining portions of the sheet member 10 is not limited to a particular method. For example, portions of the sheet member 10 may be joined by friction stir welding (FSW) or may be joined by welding. In addition, the portions of the sheet member 10 may be joined with an adhesive. Upon folding the sheet member 10 formed of the metal material, springback may occur. However, neighboring portions of the sheet member 10 are joined at the position on the other surface of the sheet member 10, where each of the ribs 121, 122, and 123 is formed, thereby stabilizing shapes of the ribs 121, 122, and 123 in the grid-stiffened structure 1. Note that the details of the connection of the sheet member will be described later.

Note that, on the other surface of the sheet member 10, a back plate (that is, a second outer panel 86) may be disposed, and the back plate may be attached to the sheet member 10 as necessary. In FIG. 6, such a step is omitted.

Finally, by trimming unnecessary portions in Step S65, the grid-stiffened structure 1 in which the outer panel 11 and the lattice-like ribs 121, 122, and 123 are integrated and which is formed of the metal material is completed.

Connection of Ends of Ribs

As described above, in the grid-stiffened structure 1 manufactured by bending the sheet member 10, the ribs 121, 122, and 123 extending in the first, the second, and the third directions, respectively are separated by the through-holes 15 formed in the sheet member 10 and are not continuous. This configuration reduces the strength of the grid-stiffened structure 1.

Figure 7:
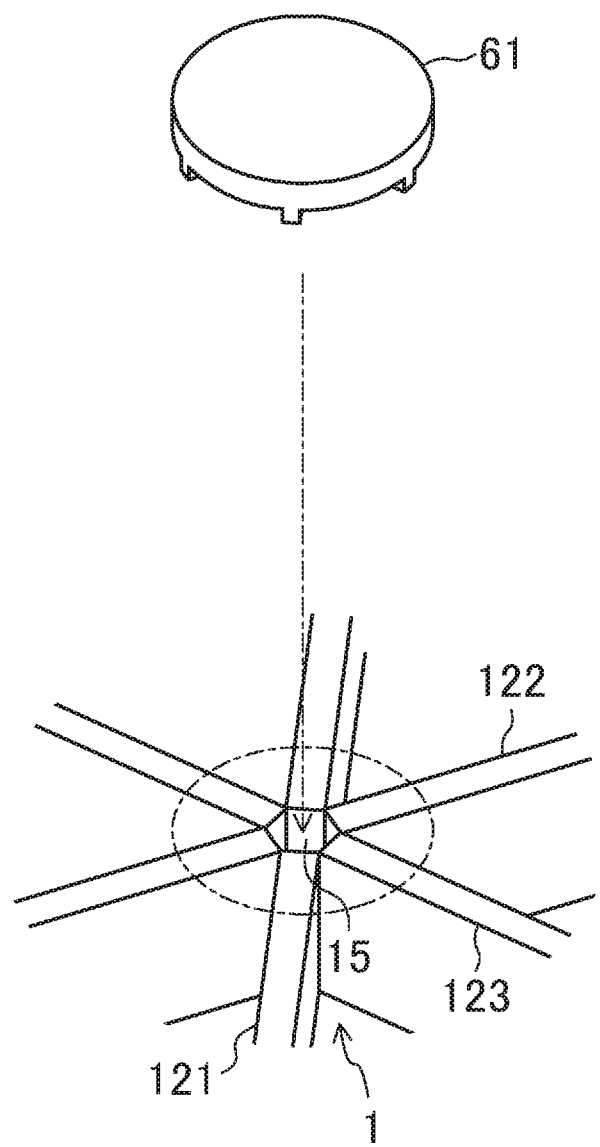
FIG. 7 is a perspective view illustrating a connecting part attached to the grid-stiffened structure.

Therefore, it is preferable that ends of the ribs 121, 122, and 123 are connected to each other. For example, FIG. 7 shows a configuration in which the ends of the ribs 121, 122, and 123 are connected to each other, by attaching a connecting part 61 to the ends of the ribs 121, 122, and 123 adjacent to each other, respectively in a position of each of the through-holes 15. The connecting part 61 may be attached to the ribs 121, 122, and 123 in the above-mentioned step S43, S53, or S63. Note that the shape of the connecting part 61 is not limited to the shape as illustrated therein and can be any shape.

In addition, although the illustration is omitted, the ends of the ribs 121, 122, and 123 may be connected to each other with an adhesive to be filled in spaces between the ends of the ribs 121, 122, and 123 adjacent to each other in the position of each of the through-holes 15.

The separated ribs 121, 122, and 123 are connected by the connecting part 61 or the adhesive, thereby allowing the strength of the grid-stiffened structure 1 to be enhanced.

Configuration of Enlarged Through-Holes

FIG. 8 illustrates a grid-stiffened structure 2 as a modified example. FIG. 9 illustrates a sheet member 20 used for manufacturing the grid-stiffened structure 2 shown in FIG. 8. Note that FIG. 8 illustrates only a portion around one through-hole 25 in the grid-stiffened structure 2. FIG. 9 illustrates the sheet member 20 used for manufacturing the grid-stiffened structure 2. In FIG. 8, a reference sign 21 indicates an outer panel in the grid-stiffened structure 2, a reference sign 221 indicates a rib which extends in a first direction, a reference sign 222 indicates a rib which extends in a second direction, a reference sign 223 indicates a rib which extends in a third direction, a reference sign 23 indicates a cell, which is equilateral-triangular, and a reference sign 25 indicates a through-hole. In addition, in FIG. 9, a reference sign 241 indicates a rib configuring region which extends in a first direction, a reference sign 242 indicates a rib configuring region which extends in a second direction, and a reference sign 243 indicates a rib configuring region which extends in a third direction.

In the grid-stiffened structure 2 and the sheet member 20 shown in FIG. 8 and FIG. 9, a size of the through-hole 25 is larger than a size of each of the through-holes 15 in the grid-stiffened structure 1 and the sheet member 10 shown in FIG. 1 and FIG. 2 (see arrows in FIG. 9).

Specifically, as shown in FIG. 9, in the sheet member 20, the through-hole 25 formed is hexagonal and has a diameter larger than a minimum diameter of a through-hole (in other words, which corresponds to each of the through-holes 15 in the sheet member 10) indicated by a two-dot chain line is formed. In other words, it can be said that in the grid-stiffened structure 2 and the sheet member 20 shown in FIG. 8 and FIG. 9, a cutout is provided in an outer peripheral portion of the through-hole, indicated by the two-dot chain line, so as to enlarge the through-hole.

Note that a shape of the through-hole 25 is not limited to the hexagon. Although the illustration is omitted, the shape of the through-hole may be, for example, circular. In addition, in the sheet member 20 shown in FIG. 9, by enlarging each of the hexagonal through-holes having the minimum diameter as it is, each portion of an opening edge of the through-hole 25 between the neighboring rib configuring regions 241, 242, and 243 and the neighboring rib configuring regions 241, 242, and 243 in a circumferential direction is bent so as to be V-shaped. However, although the illustration is omitted, by changing the above-mentioned each V-shaped bent portion of the opening edge of the through-hole 25 between the neighboring rib configuring regions 241, 242, and 243 and the neighboring regions 241, 242, and 243 in the circumferential direction into a straight line, a dodecagonal through-hole as a whole may be formed.

By folding the rib configuring regions 241, 242, and 243 of the sheet member 20 as described above, as shown in FIG. 8, the ribs 221, 222, and 223 which protrude from one surface of the sheet member 20 can be provided integrally with the outer panel 21.

By enlarging the through-hole 25, spaces between the ends of the ribs 221, 222, and 223 adjacent to each other at the through-hole 25 of the grid-stiffened structure 2 become larger than those in the grid-stiffened structure 1 shown in FIG. 1. In this grid-stiffened structure 2, the empty spaces at the position of the through-holes 25 are large, such that attachment of each connecting part (not shown) for connecting the ends of the ribs 221, 222, and 223 is facilitated.

Modified Example of Configuration of Connection of Ends of Ribs

Figure 10A:
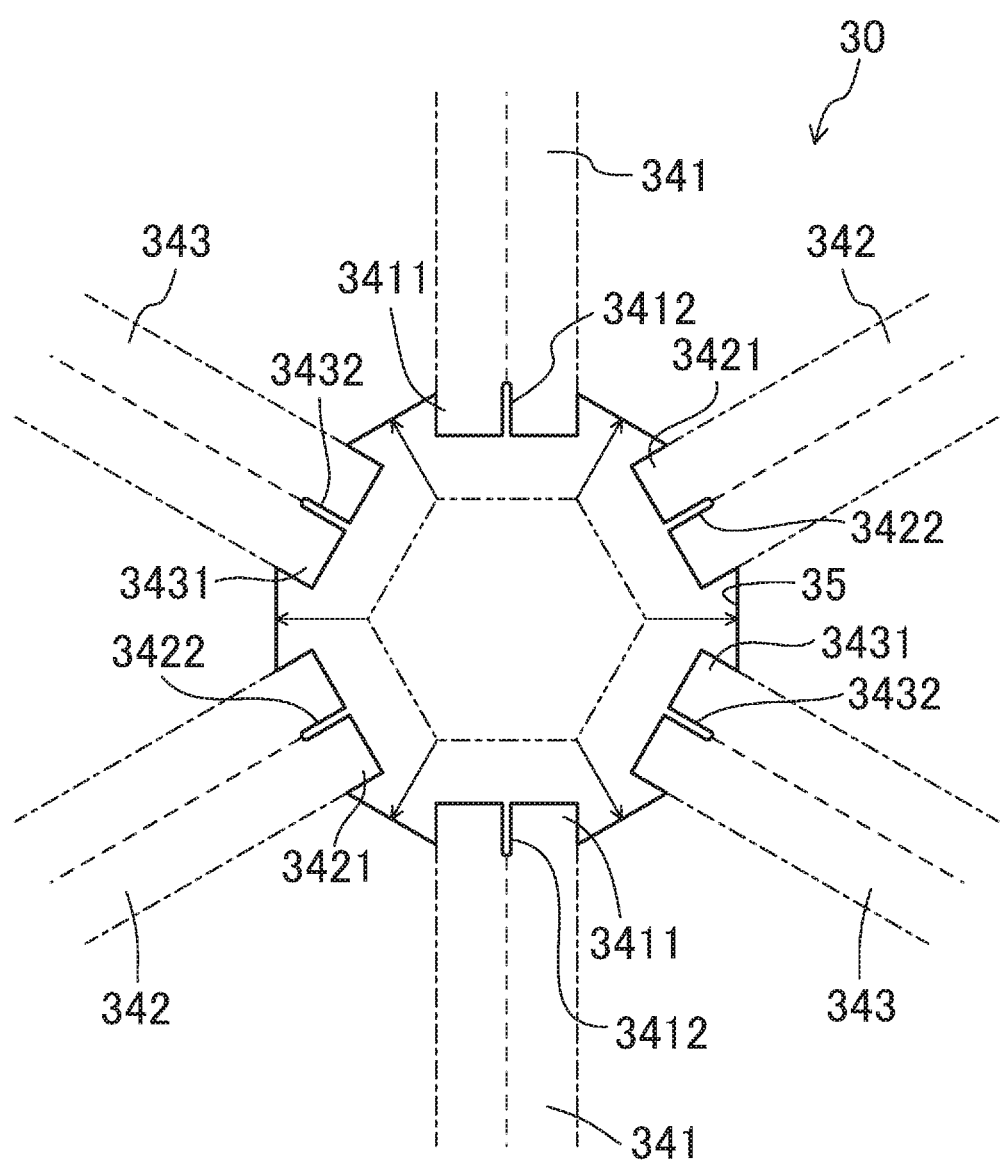
FIG. 10A is a plan view illustrating a configuration in which extending parts are integrated with rib configuring regions.
Figure 10B:
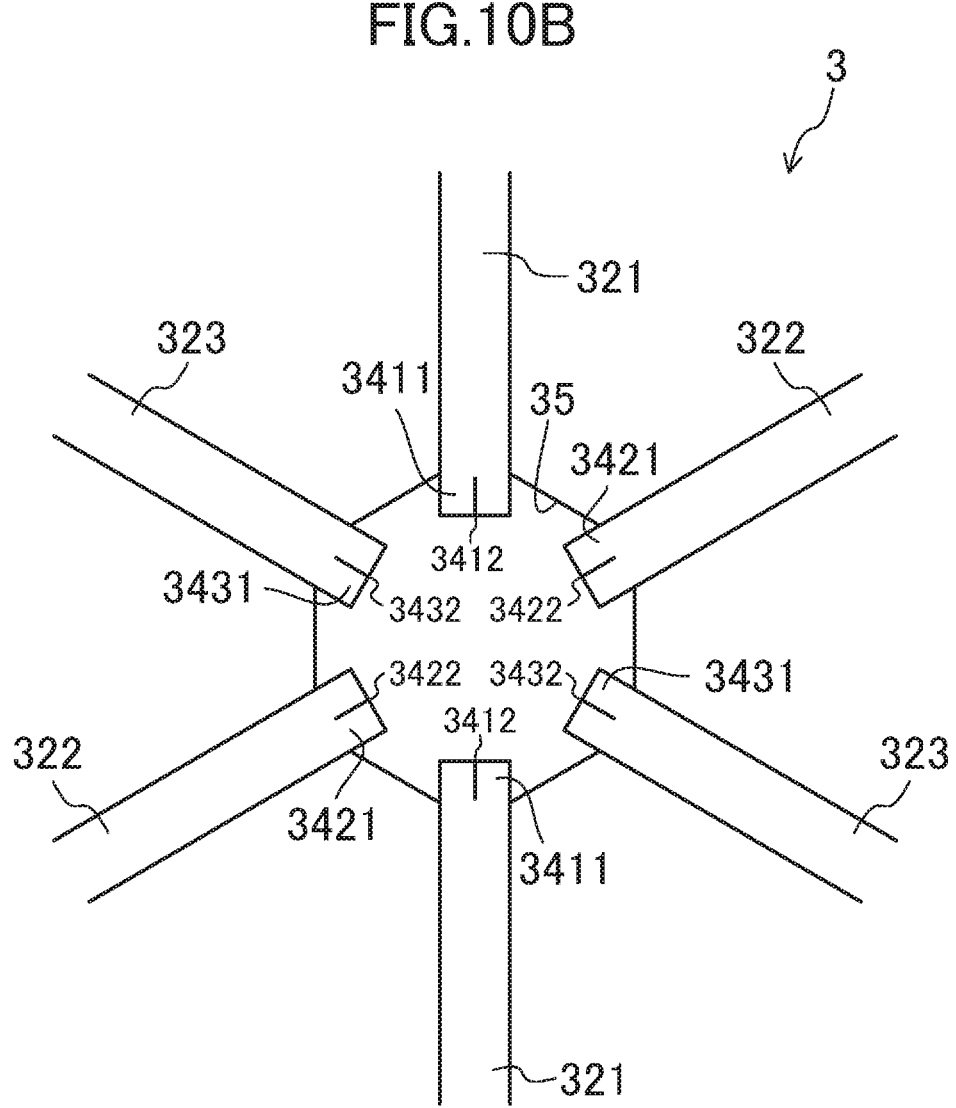
FIG. 10B is a plan view illustrating a state in which ribs and the extending parts are configured by folding the rib configuring regions of the sheet member shown in FIG. 10A.

Each of FIGS. 10A to 10C illustrates a modified example of a configuration in which each of through-holes 35 in a sheet member 30 is enlarged. In other words, in the sheet member 30 and the grid-stiffened structure 3 shown in FIGS. 10A to 10C, a configuration in which ends of ribs 321, 322, and 323 are connected to each other is added to a configuration in which each of the through-holes 35 in the sheet member 30 is enlarged.

Specifically, as shown in FIG. 10A, in the sheet member 30, the through-hole 35 having a predetermined shape is formed. This through-hole 35 is enlarged by providing cutouts in an outer peripheral portion (see arrows in FIG. 10A). In addition, rib configuring regions 341, 342, and 343 which respectively extend in first, second, and third directions are integrally provided with extending parts 3411, 3421, and 3431 which extend toward the center of the through-hole 35. Thus, an opening edge of the through-hole 35 has a predetermined shape.

The extending parts 3411, 3421, and 3431 are respectively provided with cutouts 3412, 3422, and 3432 in central positions thereof in width directions. The cutouts 3412, 3422, and 3432 extend from leading ends of the extending parts 3411, 3421, and 3431 toward base ends thereof. The cutouts 3412, 3422, and 3432 are located on extended lines of the rib configuring regions 341, 342, and 343 (that is, lines indicated by broken lines) along which the sheet member 30 is mountain-folded.

As mentioned above, by folding the rib configuring regions 341, 342, and 343 of the sheet member 30 shown in FIG. 10A, the ribs 321, 322, and 323 are formed. FIG. 10B illustrates a state in which the ribs 321, 322, and 323 are formed. At this time, the extending parts 3411, 3421, and 3431 are also folded in positions of the cutouts 3412, 3422, and 3432. The extending parts 3411, 3421, and 3431 protrude from the opening edge of the through-hole 35 toward the center of the through-hole 35.

By opening portions of both sides of each of the of the extending parts 3411, 3421, and 3431 so as to be separated from each other, as shown in FIG. 10C, ends of the ribs 321, 322, and 323 adjacent to each other in a circumferential direction are mutually joined via the extending parts 3411, 3421, and 3431. An appropriate method may be employed for mutually joining the extending parts 3411, 3421, and 3431.

Thus, in a position of each of the through-holes 35 in the grid-stiffened structure 3, a connecting part having a hexagonal loop-like shape, which mutually connects the ends of the ribs 321, 322, and 323, can be provided. The loop-like connecting part has an advantage in that stress concentration can be prevented. Note that although, in FIG. 10C, the extending parts 3411, 3421, and 3431 are connected to be of the hexagonal loop-like shape, the extending parts 3411, 3421, and 3431 may be connected to be of, for example, a circular loop-like shape though the illustration is omitted.

Configuration of Preventing Stress Concentration in Positions Where Ribs Intersect If ribs provided in a grid-stiffened structure are caused to mutually intersect in positions where through-holes are formed, stress concentration is likely to be caused. Each of FIG. 11 and FIG. 12 illustrates a configuration which is effective in avoiding the stress concentration in each position where ribs 421, 422, and 423 intersect in a grid-stiffened structure 4. Specifically, in a sheet member 40 shown in FIG. 11, positions of rib configuring regions 441, 442, and 443 are shifted, as compared with the sheet member 20 shown in FIG. 9 in which each of the through-holes 25 is enlarged. In other words, two-dot chain lines in FIG. 11 indicate positions of the rib configuring regions 241, 242, and 243 in the sheet member 20 shown in FIG. 9. As shown in FIG. 11, in this sheet member 40, a position of a rib configuring region 441 which extends in a first direction is shifted to the left in FIG. 11. In addition, a position of a rib configuring region 442 which extends in a second direction is shifted to the lower right in FIG. 11. Further, a position of a rib configuring region 443 which extends in a third direction is shifted to the upper right in FIG. 11. By enlarging a through-hole 45, the positions of the rib configuring regions 441, 442, and 443 can be shifted within the limit of the range of an opening edge of the through-hole 45.

Note that although in FIG. 11, only the rib configuring regions 441, 442, and 443 around one through-hole 45 are shown, in the sheet member 40, positions of all of the plurality of rib configuring regions 441 which extend in the first direction are shifted to the same left direction, positions of all of the plurality of rib configuring regions 442 which extend in the second direction are shifted to the same lower right direction, and positions of all of the plurality of rib configuring regions 443 which extend in the third direction are shifted to the same upper right direction.

By folding the rib configuring regions 441, 442, and 443 in the sheet member 40 shown in FIG. 11 and thereby forming the ribs 421, 422, and 423, the grid-stiffened structure 4 is manufactured as illustrated in FIG. 12. In FIG. 12, a reference sign 41 indicates an outer panel in the grid-stiffened structure 4, a reference sign 421 indicates a rib which extends in a first direction, a reference sign 422 indicates a rib which extends in a second direction, a reference sign 423 indicates a rib which extends in a third direction, a reference sign 43 indicates each cell, which is equilateral-triangular, and a reference sign 45 indicates each through-hole, respectively. In this grid-stiffened structure 4, the rib 421 which extends in the first direction, the rib 422 which extends in the second direction, and the rib 423 which extends in the third direction do not intersect at one point. Positions of an intersection point of the rib 421 extending in the first direction and the rib 422 extending in the second direction, an intersection point of the rib 422 extending in the second direction and the rib 423 extending in the third direction, and an intersection point of the rib 423 extending in the third direction and the rib 421 extending in the first direction are shifted from one another. Thus, this grid-stiffened structure 4 can prevent the stress concentration in the positions in which the ribs 421, 422, and 423 intersect.

Note that also in the grid-stiffened structure 4, ends of the ribs 421, 422, and 423 are connected by employing an appropriate method.

Variations as to Shape of Grid-Stiffened Structure

FIGS. 13 to 16 illustrate variations as to shapes of grid-stiffened structures. Note that in each of FIGS. 13 to 16, in order to facilitate understanding, illustration of through-holes which are formed in a grid-stiffened structure is omitted.

Figure 13:
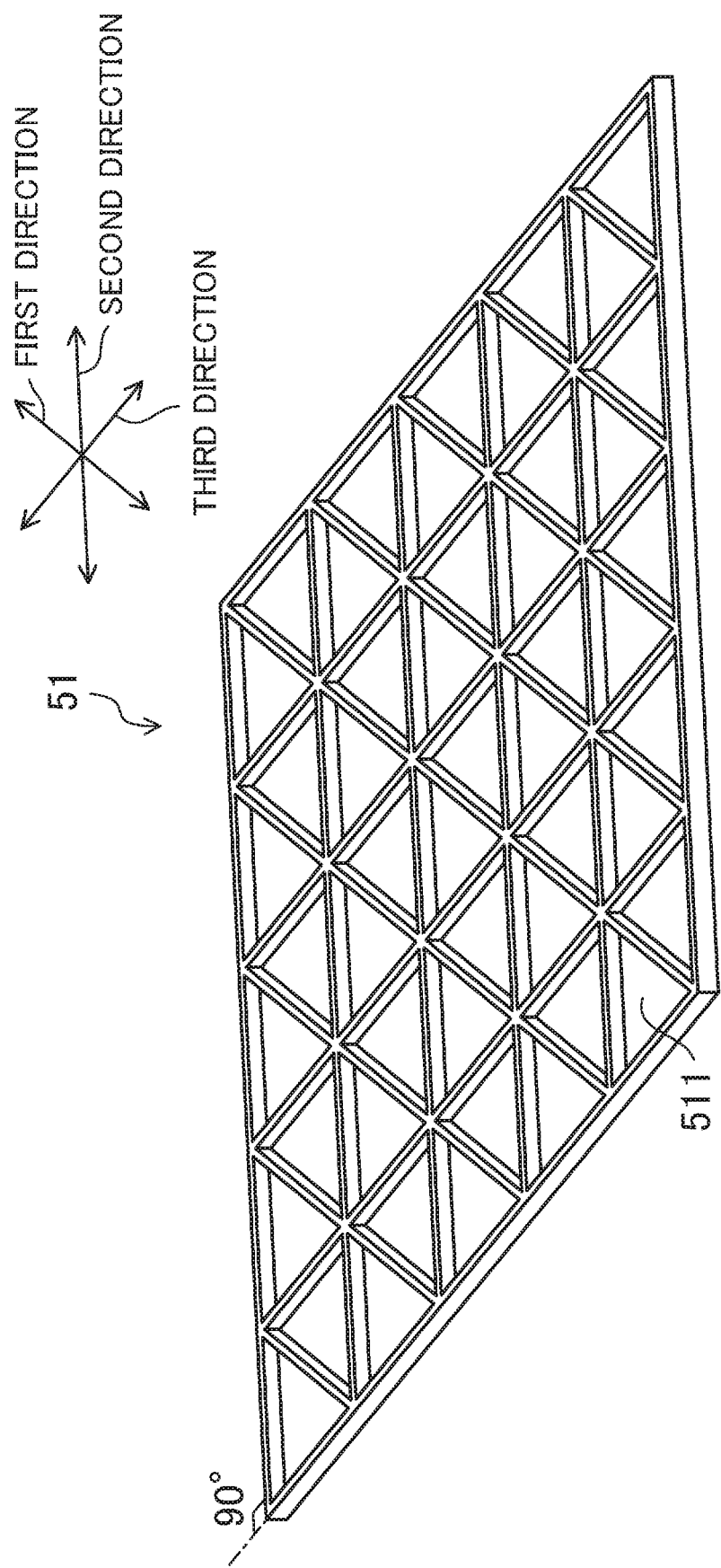
FIG. 13 is a perspective view illustrating a grid-stiffened structure having cells whose shapes of triangles are different from those shown in FIG. 1.

In a grid-stiffened structure 51 shown in FIG. 13, each cell 511 is not of an equilateral triangle shape but is of a right angled triangle shape. In other words, one internal angle of the triangle is 90°. In the method for manufacturing the grid-stiffened structure disclosed herein, a grid-stiffened structure in which each cell is of a shape of any of triangles can be manufactured.

Figure 14:
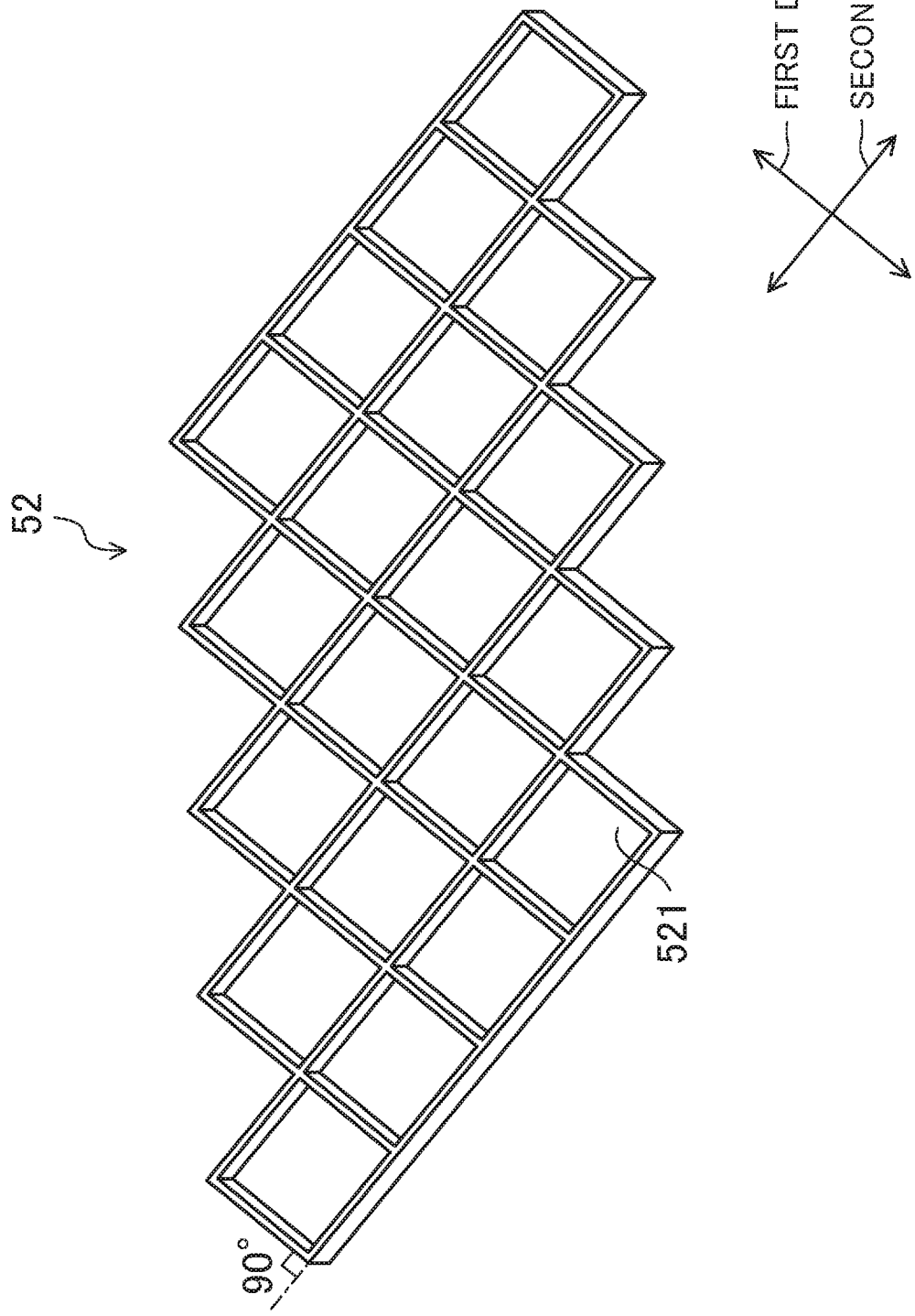
FIG. 14 is a perspective view illustrating a grid-stiffened structure having cells whose shapes are rectangular.

In a grid-stiffened structure 52 shown in FIG. 14, each cell 521 is of a rectangle shape. In other words, each of the internal angles of the quadrangle is 90°. In the method for manufacturing the grid-stiffened structure disclosed herein, an orthogrid structure can be manufactured. When the orthogrid structure is manufactured, a quadrangle lattice-like pattern in which rib configuring regions which extend in a first direction and rib configuring regions which are orthogonal to the rib configuring regions extending in the first direction and extend in a second direction are provided is set in a sheet member, and the rib configuring regions extending in the first direction are folded and the rib configuring regions extending in the second direction are folded, thereby allowing the orthogrid structure to be formed. In other words, although the illustration is omitted, the internal angles of the quadrangle of each cell may be 90° and lengths of all of sides thereof may be the same as one another.

Figure 15:
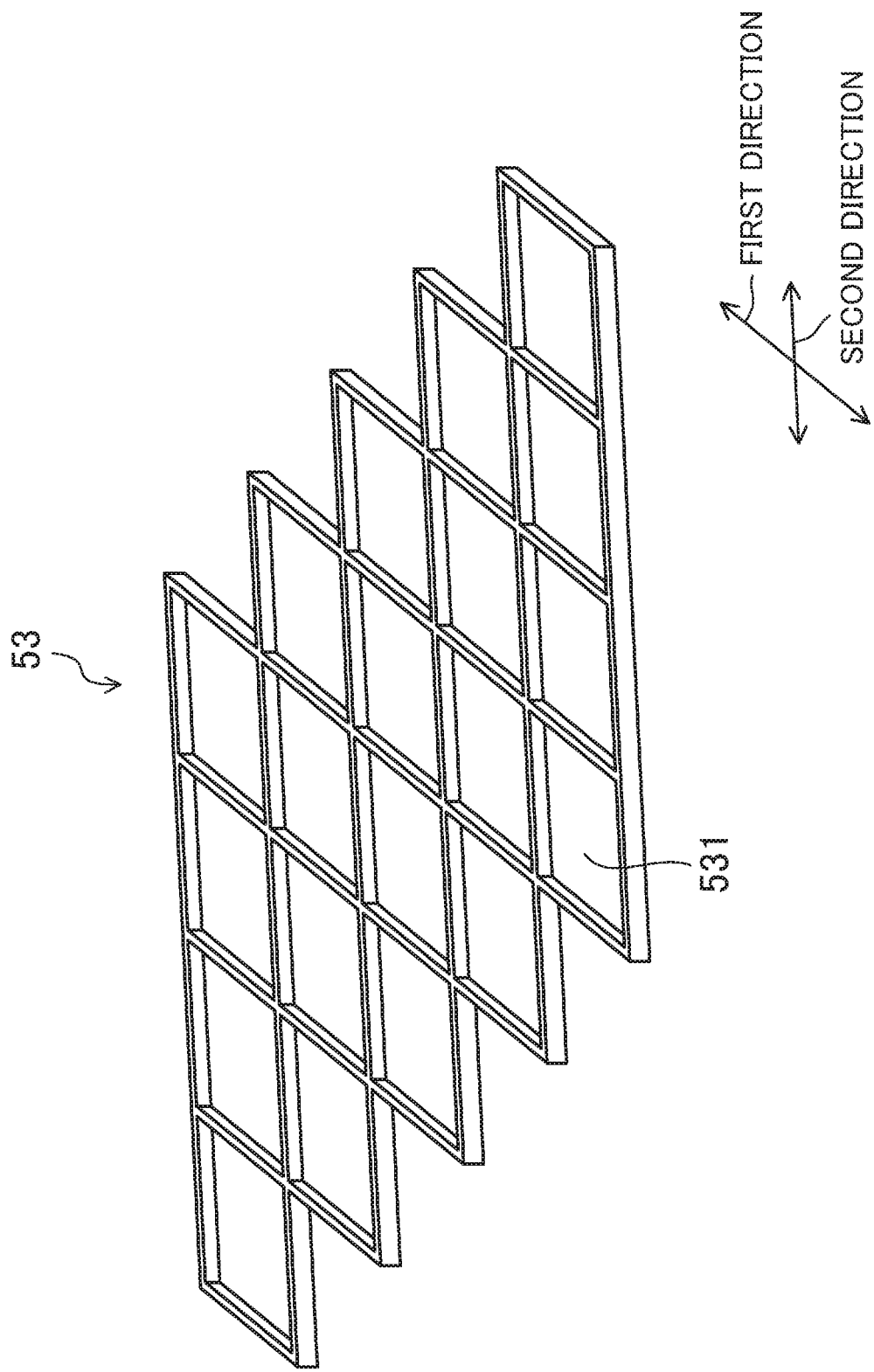
FIG. 15 is a perspective view illustrating a grid-stiffened structure having cells whose shapes are rhombic.

In a grid-stiffened structure 53 shown in FIG. 15, lengths of four sides of each cell 531 are the same as one another. Also when this grid-stiffened structure 53 is manufactured, a lattice-like pattern in which rib configuring regions which extend in a first direction and rib configuring regions which are different from the rib configuring regions extending in the first direction and extend in a second direction are provided is set in a sheet member, and the rib configuring regions extending in the first direction are folded and the rib configuring regions extending in the second direction are folded, thereby allowing the grid-stiffened structure to be formed.

Figure 16:
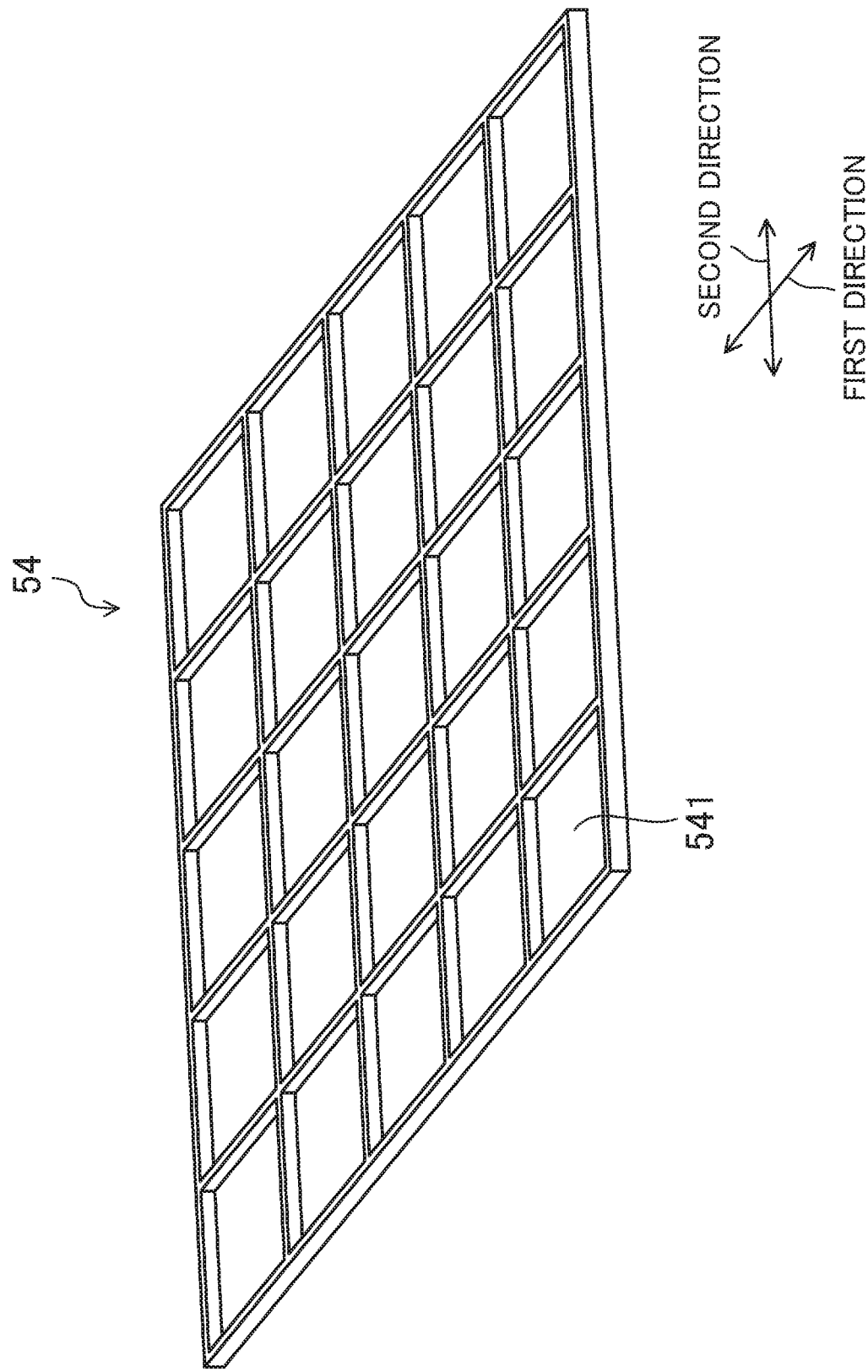
FIG. 16 is a perspective view illustrating a grid-stiffened structure having cells which are parallelogram-shaped.

In a grid-stiffened structure 54 shown in FIG. 16, each cell 541 is of a quadrangle shape having two pairs of facing sides arranged in parallel. Also when this grid-stiffened structure 54 is manufactured, a lattice-like pattern in which rib configuring regions which extend in a first direction and rib configuring regions which are different from the rib configuring regions extending in the first direction and extend in a second direction are provided is set in a sheet member, and the rib configuring regions extending in the first direction are folded and the rib configuring regions extending in the second direction are folded, thereby allowing the grid-stiffened structure to be formed.

Modified Example of Height of Rib

Heights H of ribs in a grid-stiffened structure can be set to appropriate heights. As described above, each of the heights H of the ribs is determined by the width W2 of the rib configuring region.

Figure 17:
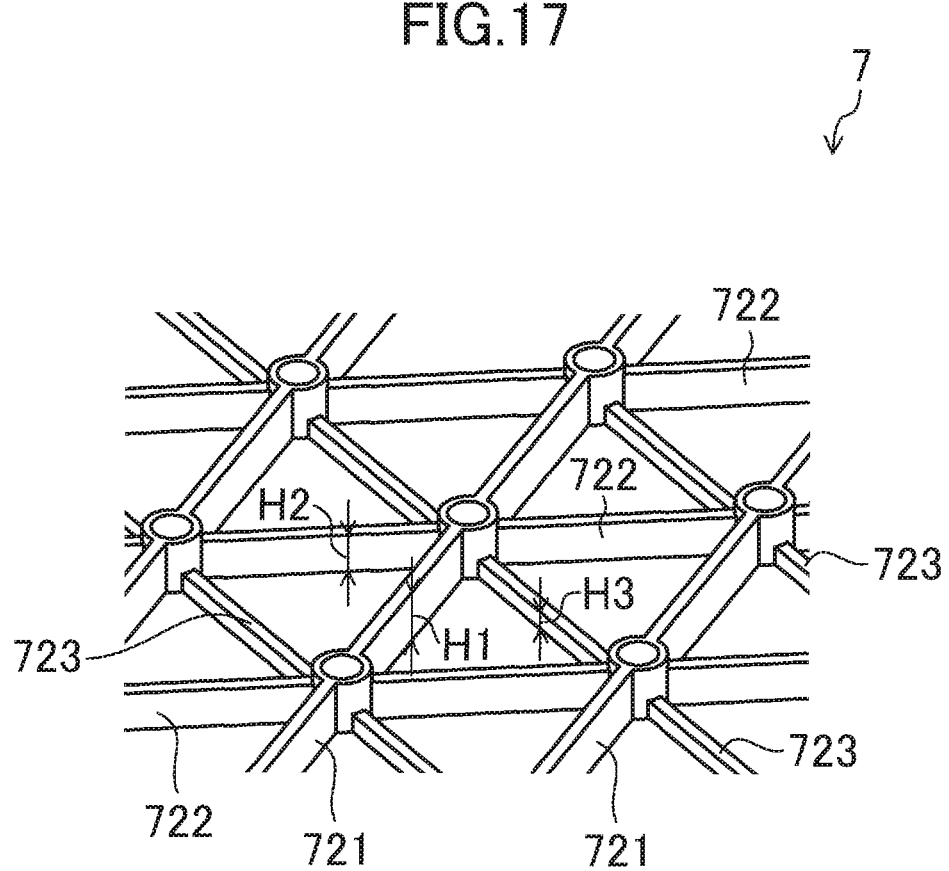
FIG. 17 is a perspective view illustrating a grid-stiffened structure in which heights of ribs are different from one another.

Here, a width of each of the rib configuring regions which extend in a first direction and a width of each of the rib configuring regions which extend in a second direction may be different from each other. In addition, a width of each of the rib configuring regions which extend in a third direction and the width of each of the rib configuring regions which extend in the first direction may be different from each other. In this way, for example, as in a grid-stiffened structure 7 illustrated in FIG. 17, a height H1 of each of ribs 721 which extend in a first direction, a height H2 of each of ribs 722 which extend in a second direction, and a height H3 of each of ribs 723 which extend in a third direction may be different from one another.

Note that among the height of each of the ribs extending in the first direction, the height of each of the ribs extending in the second direction, and the height of each of the ribs extending in the third direction, the two heights of each thereof may be the same, and the remaining one height may be different from the two heights.

In addition, although the illustration is omitted, in the grid-stiffened structure in which the cells are quadrangular, a height of each of ribs extending in the first direction and a height of each of the ribs extending in the second direction may be made different from each other.

Variations of Reinforcement Structure of Grid-Stiffened Structure

Each of FIGS. 18A to 18D illustrates variations of each rib 82. As described above, in the method for manufacturing the grid-stiffened structure disclosed herein, the ribs 82 are formed by folding the sheet member. On the other surface of an outer panel 81 (a lower surface thereof in each of FIGS. 18A to 18D), at a position where the rib 82 is formed, portions of the sheet member 80 are disposed so as to be adjacent to each other.

Figure 18A:
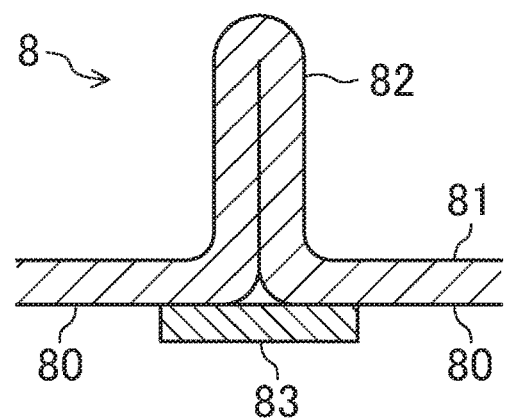
FIG. 18A is a cross-sectional view illustrating a configuration example in which a reinforcement member is attached at a position on another surface of an outer panel, where each of the rib is formed.

For example, as shown in FIG. 18A, a reinforcement member 83 may be attached at a position on the other surface of the outer panel 81, where the rib 82 is formed, thereby mutually joining portions of the sheet member 80. The reinforcement member 83 can be formed of an appropriate material. In addition, the reinforcement member 83 can be attached to the other surface of the sheet member 80 by employing a variety of methods. By attaching the reinforcement member 83, the portions of the sheet member 80 can be prevented from being mutually separated and a shape of the rib 82 formed by folding the sheet member 80 can be stabilized. This is advantageous in enhancing the strength of the grid-stiffened structure 8.

Figure 18B:
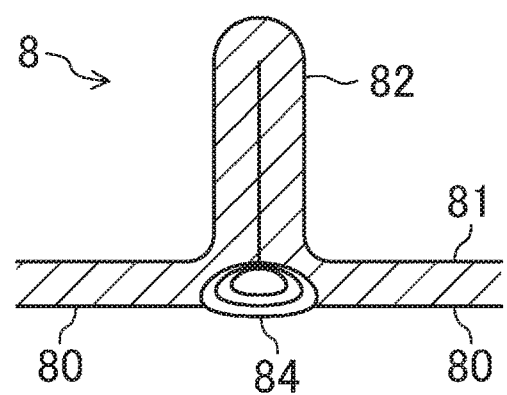
FIG. 18B is a cross-sectional view illustrating a configuration example in which the position on the other surface of the outer panel, where each of the ribs is formed, is welded.

In addition, as shown in FIG. 18B, at the position on the other surface of the outer panel 81, where the rib 82 is formed, portions of the sheet member 80 may be mutually joined by a weld 84. Note that as the weld 84 referred to herein, a weld formed by the so-called metal welding such as arc welding, electron beam welding, or laser beam welding, and in addition thereto, a weld formed by brazing or friction stir welding are also included. In this way, similarly as mentioned above, the portions of the sheet member 80 can be prevented from being mutually separated and the shape of the rib 82 formed by folding the sheet member 80 can be stabilized.

Figure 18C:
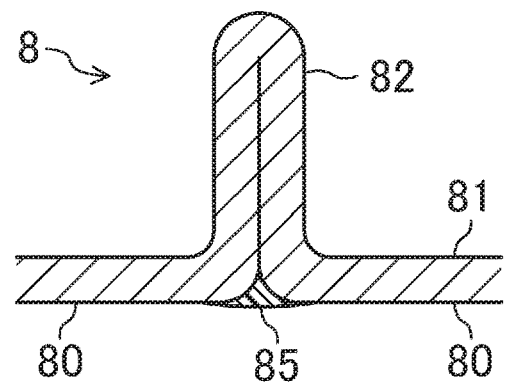
FIG. 18C is a cross-sectional view illustrating a configuration example in which the position on the other surface of the outer panel, where each of the ribs is formed, is caused to adhere to each other by an adhesive.

Further, as shown in FIG. 18C, at the position on the other surface of the outer panel 81, where the rib 82 is formed, portions of the sheet member 80 may be caused to adhere to each other by an adhesive 85.

Figure 18D:
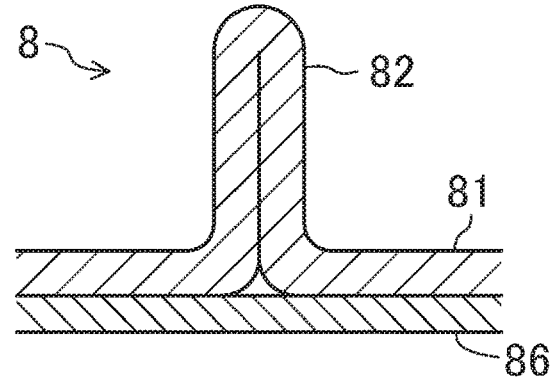
FIG. 18D is a cross-sectional view illustrating a configuration example in which a second outer panel is attached to the other surface of the outer panel.

In addition, as shown in FIG. 18D, a second outer panel 86 may be attached to the other surface of the outer panel 81 so as to cover the whole of the other surface of the outer panel 81 (also refer to the process P5 in FIG. 3). Also in this way, shapes of all of the ribs formed by folding the sheet member 80 can be stabilized.

Note that as shown in FIG. 18A and the like, inside the rib 82 formed by folding the sheet member 80 such that portions, on the other surface of the sheet member 80, come into contact with each other, the portions of the other surface of the sheet member 80 in contact with each other may be joined by welding. In addition, inside the rib 82 formed by folding the sheet member 80, portions of the other surface of the sheet member 80 in contact with each other may be caused to adhere to each other by an adhesive. In this way, since the strength of the rib 82 can be enhanced, the strength of the grid-stiffened structure 8 can be enhanced.

Variations of Shape of Rib

Figure 19A:
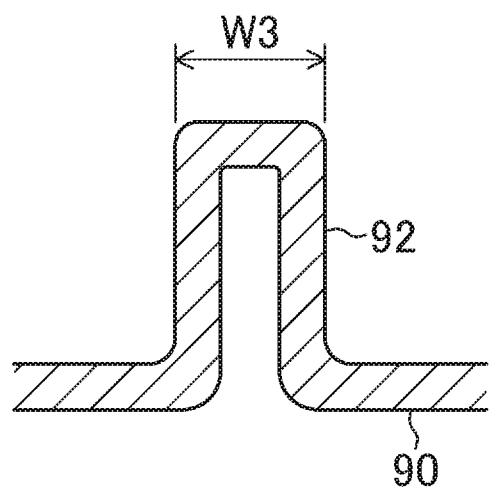
FIG. 19A is a cross-sectional view illustrating a rib whose rib configuring region is folded so as to have an inverted U-shaped cross section.

A shape of each of the ribs formed by folding the sheet member is not limited to the shape formed by causing portions of the other surface of the sheet member in contact with each other as shown in FIG. 18A and the like. For example, as shown in FIG. 19A, a rib 92 may be of a shape whose cross-section is an inverted U-shape. At this rib 92, portions of the other surface of a sheet member 90 are not in contact with each other. In this way, it is made possible to adjust a width W3 of the rib 92 in the grid-stiffened structure to an appropriate width.

Note that on the other surface of the sheet member 90, as shown in FIG. 19A, a space between portions of the sheet member 90 may be hollow. In addition, the space between the portions of the sheet member 90 may be filled with an appropriate filler.

Figure 19B:
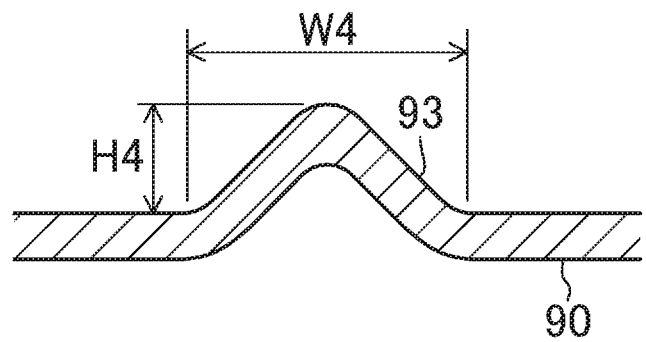
FIG. 19B is a cross-sectional view illustrating a rib whose rib configuring region is folded so as to have an inverted V-shaped cross section.

In addition, as shown in FIG. 19B, a rib 93 may be of a shape whose cross-section is an inverted V-shape. Note that a width W4 and a height H4 of the rib 93 whose cross-section is an inverted V-shape can be set to an appropriate width and an appropriate height.

Figure 19C:
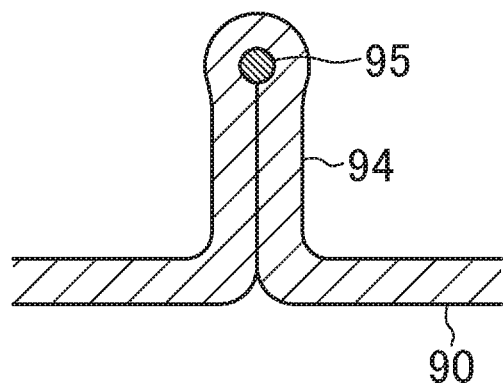
FIG. 19C is a cross-sectional view illustrating a configuration example in which a round bar is disposed in an upper end portion of a rib.

Further, as shown in FIG. 19C, an upper end portion of a rib 94 may be configured to be round-shaped. In a configuration example in FIG. 19C, by sandwiching a member 95, whose cross-section is circular, between portions of the sheet member 90 and folding the sheet member 90, the member 95 whose cross-section is circular is embedded inside the rib 94. By forming the upper end portion of the rib 94 so as to be round-shaped, stress concentration can be avoided.

FIG. 20 illustrates one part of a procedure of manufacturing the grid-stiffened structure shown in FIG. 19C. As described above, when the sheet member 90 is sandwiched between female molds 101 and male molds 102, the member 95 (that is, a round bar) embedded inside the rib 94 is interposed between the male molds 102 and the sheet member 90 (a process P11). Note that in a process P12 after folding the sheet member 90 by using the female molds 101 and the male molds 102, the member 95 may be disposed inside a groove formed to be V-shaped.

In a process P13, with the member 95 disposed inside the groove, the sheet member 90 is further folded. In this way, since the member 95 is sandwiched between the portions of the sheet member 90, as shown in FIG. 19C, it is made possible to embed the member 95 in the upper end portion of the rib 94.

Note that although after forming the ribs extending in the first direction, upon forming the ribs extending in the second direction and the ribs extending in the third direction, the members 95 may be left as they are, when upon disposing other members 95 for forming the ribs extending in the second direction or the third direction, the above-mentioned other members 95 interfere with the previously disposed members 95, portions located in the vicinity of the through-holes may be removed (removed, for example, by cutting the above-mentioned portions).

Note that the sheet member may be folded such that the upper end portion of each of the ribs is round-shaped without embedding the member inside each of the ribs.

In addition, although the illustration is omitted, top portions of the ribs in the grid-stiffened structure, which protrude from one surface of the outer panel, may be partially whittled so as to have appropriate shapes.

The above-described configuration examples can be appropriately combined.

Application Examples of Grid-Stiffened Structure

The grid-stiffened structure disclosed herein can be used for a variety of products.

The grid-stiffened structure disclosed herein can be used for, for example, structural members and interior members of aircraft. In addition, the grid-stiffened structure disclosed herein can be used for, for example, footboards of cargo handling gears, attached to rear parts and the like of a variety of transporter vehicles. Further, the grid-stiffened structure disclosed herein can also be used for pallets and the like in a multistory parking garage, on each of which a vehicle is loaded.

In addition, the grid-stiffened structure disclosed herein can also be used for, for example, chassis, bodies, and the like of automobiles. In addition, the grid-stiffened structure disclosed herein can also be used for housings and the like of electronic devices such as notebook computers. In addition, the grid-stiffened structure disclosed herein can also be used for structures of a variety of mechanical products. In addition, the grid-stiffened structure disclosed herein can also be used for flat plates of furniture and the like.

Figure 21:
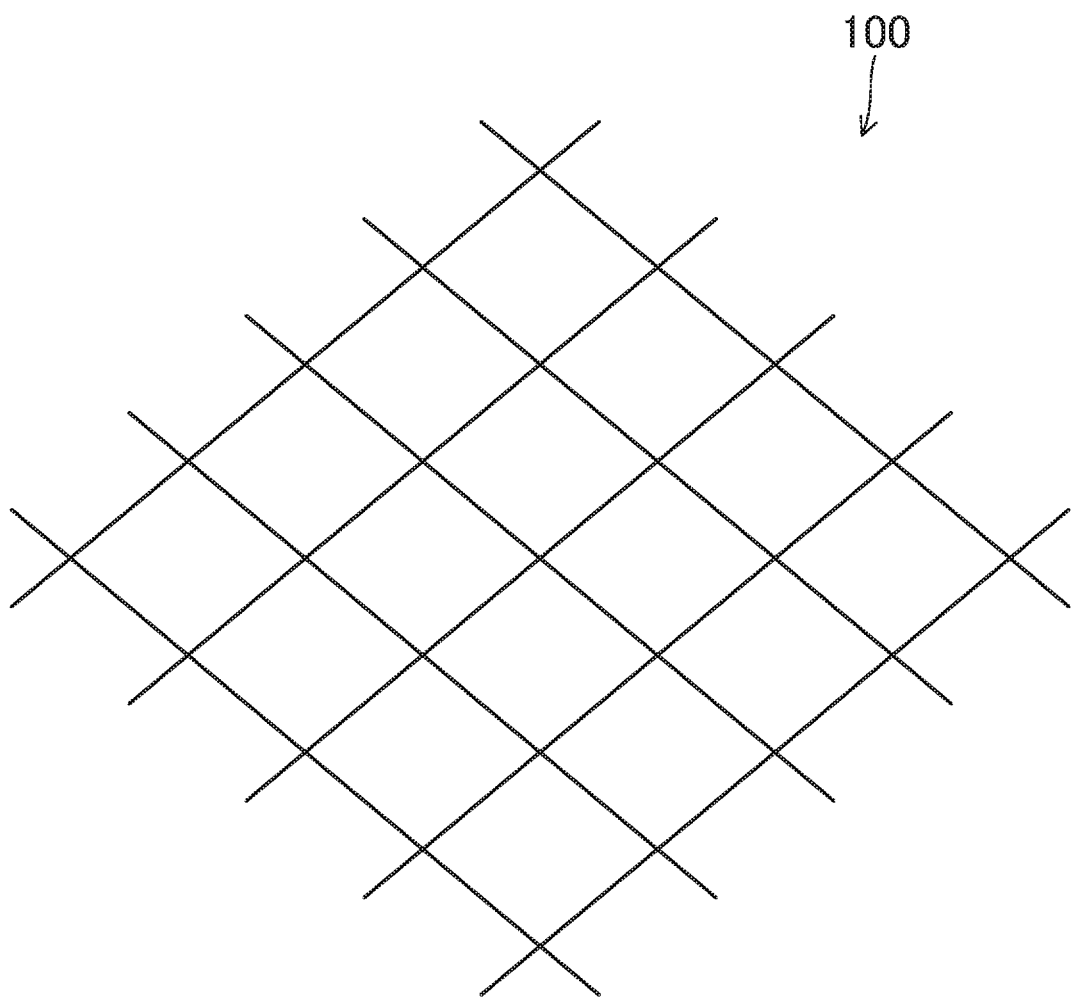
FIG. 21 is a perspective view illustrating a sheet member which is configured by forming wires into a net.

Further, the sheet member for manufacturing the grid-stiffened structure disclosed herein is not limited to the flat plate. For example, the sheet member therefor may be a plate member formed of wires, which are subjected to plastic working, shaped into a net. Specifically, as illustrated in FIG. 21, for example, a steel wire which constitutes reinforcing steel rods of reinforced-concrete is formed into a net-like plate member, and the obtained plate member may be a sheet member 100. By folding this net-like sheet member 100 in accordance with the above-described procedure, ribs are provided integrally therewith, and thus, a grid-stiffened structure may be produced. The grid-stiffened structure produced as described above can be used for manufacturing a precast concrete panel. For example, the above-mentioned grid-stiffened structure is installed in a mold frame and thereafter, concrete is poured, thereby manufacturing the precast concrete panel.

Characteristics of Grid-Stiffened Structure

The grid-stiffened structure described herein has the following characteristics. Specifically, the grid-stiffened structure has the triangular or quadrangular lattice-like ribs which are provided integrally with the one surface of the outer panel, the outer panel and the ribs are constituted of the folded one continuous sheet member, and in the sheet member, the through-holes which separate the ribs are formed (see FIG. 1, FIG. 8, FIG. 12, and FIGS. 13 to 16).

The grid-stiffened structure may include the connecting parts attached between the ends of the ribs adjacent to each other in the position of each of the through-holes and connecting the ends of the ribs to each other (see FIG. 7).

In the grid-stiffened structure, the ends of the ribs may be connected to each other with the adhesive filled in a space between the ends of the ribs adjacent to each other in the position of each of the through-holes.

The grid-stiffened structure may include the extending parts which are provided integrally with the ribs and protrude from ends of the ribs toward the centers of the through-holes, and the ends of the ribs may be connected to each other via the extending parts (see FIG. 10C).

The grid-stiffened structure may include on the other surface of the outer panel the reinforcement members which are attached to the positions where the ribs are formed (see FIG. 18A).

In the grid-stiffened structure, in each of the positions where the ribs are formed, neighboring portions of the sheet members with each of the ribs sandwiched therebetween may be caused to adhere to each other by the adhesive (see FIG. 18C).

In the grid-stiffened structure, in each of the positions where the ribs are formed, the portions, on the other surface of the outer panel, of the sheet member are welded where each of the ribs is formed. The portions of the sheet member are adjacent to each other with the rib sandwiched therebetween (see FIG. 18B).

The grid-stiffened structure may include the second outer panel attached to the other surface of the outer panel so as to be laid thereon (see FIG. 18D).

In the grid-stiffened structure, in each of the ribs formed by folding the sheet member such that portions of the other surface of the sheet member come into contact with each other, the portions of the other surface in contact may be caused to adhere to each other by the adhesive.

In the grid-stiffened structure, in each of the ribs formed by folding the sheet member such that portions of the other surface of the sheet member come into contact each other, the portions of the other surface of the sheet member may be caused to adhere to each other by welding.

In the grid-stiffened structure, the top portion of each of the ribs may be round-shaped.

In the grid-stiffened structure, inside each of the ribs, the member whose cross-section is circular may be embedded (see FIG. 19C).

Each of the ribs in the grid-stiffened structure may have an inverted U-shaped cross section (see FIG. 19A).

Each of the ribs in the grid-stiffened structure may have an inverted V-shaped cross section (see FIG. 19B).

In the grid-stiffened structure, the top portion of each of the ribs may be whittled so as to have the predetermined shape.

In the grid-stiffened structure, by making each of the through-holes large, the ends of the ribs adjacent to each other in the position of each of the through-holes may be separated from each other (see FIG. 8).

In the grid-stiffened structure, each of the cells may be triangular, the position where the rib extending in the first direction and the rib extending in the second direction intersect, the position where the rib extending in the second direction and the rib extending in the third direction intersect, and the position where the rib extending in the third direction and the rib extending in the first direction may be shifted from one another (see FIG. 12).

The sheet member of the grid-stiffened structure may be the plate member subjected to the plastic working.

The sheet member of the grid-stiffened structure may be made of the fiber-reinforced thermoplastic resin composite material.

The sheet member of the grid-stiffened structure may be made of the fiber-reinforced thermosetting resin composite material.

The sheet member of the grid-stiffened structure may be the plate member formed of wires, which are subjected to the plastic working, shaped into a net (see FIG. 21).

DESCRIPTION OF REFERENCE CHARACTERS

| | |
|---|---|
| 1, 2, 3, 4, 7, 8 | Grid-Stiffened Structure |
| 10, 20, 30, 40, 70, 80, 90 | Sheet Member |
| 11, 41, 81 | Outer Panel |
| 15, 25, 35, 45 | Through-Holes |
| 121 to 123 | Ribs |
| 141 to 143 | Rib Configuring Regions |
| 221 to 223 | Ribs |
| 241 to 243 | Rib Configuring Regions |
| 321 to 323 | Ribs |
| 341 to 343 | Rib Configuring Regions |
| 421 to 423 | Ribs |
| 441 to 443 | Rib Configuring Regions |
| 51 to 54 | Grid-Stiffened Structure |
| 61 | Connecting Part |
| 3411, 3421, 3431 | Extending Parts |
| 721 to 723 | Ribs |
| 82 | Ribs |
| 83 | Reinforcement Member |
| 85 | Adhesive |
| 86 | Second Outer Panel |
| 92 | Ribs |

The invention claimed is:

1. A method for manufacturing a grid-stiffened structure having triangular or quadrangular lattice-like ribs provided integrally with one surface of an outer panel, the method comprising:

regularly arranging triangular or quadrangular cells on one surface of a sheet member constituting the outer panel, and setting a lattice-like pattern provided with rib configuring regions for configuring the ribs, each of the rib configuring regions being configured between the cells;

providing through-holes in positions where the rib configuring regions of the sheet member intersect, wherein the through-holes separate the rib configuring regions;

forming the ribs protruding from the one surface of the sheet member by folding the rib configuring regions of the sheet member;

mutually connecting ends of the ribs in a position of each of the through-holes, forming a shape of an opening edge of each of the through-holes into a predetermined shape to provide, when forming the ribs by folding the rib configuring regions, extending parts protruding from the ends of the ribs toward a center of each of the through-holes, the extending parts being provided integrally with the ribs; and connecting the extending parts of the ribs adjacent to each other in the position of each of the through-holes to connect the ends of the ribs to each other.

2. The method for manufacturing the grid-stiffened structure of claim 1, further comprising,
attaching a reinforcement member in a position on another surface of the outer panel, where each of the ribs is formed.

3. The method for manufacturing the grid-stiffened structure of claim 1, further comprising,
causing portions of the sheet member to adhere to each other by an adhesive on another surface of the outer panel, in a position where each of the ribs is formed, the portions of the sheet member being adjacent to each other with the rib sandwiched.

4. The method for manufacturing the grid-stiffened structure of claim 1, further comprising, joining portions of the sheet member by welding on another surface of the outer panel, where each of the ribs is formed, the portions of the sheet member being adjacent to each other with the rib sandwiched.

5. The method for manufacturing the grid-stiffened structure of claim 1, further comprising,
attaching a second outer panel on the other surface of the outer panel so as to be laid on the other surface of the outer panel.

6. The method for manufacturing the grid-stiffened structure of claim 1, wherein
each of the ribs is configured by folding the sheet member such that the portions of the other surface of the sheet member come into contact with each other, and
the method further comprises,
causing the portions of the other surface of the sheet member to adhere to each other by the adhesive in the position where each of the ribs is formed, the portions of the other surface of the sheet member being in contact with each other.

7. The method for manufacturing the grid-stiffened structure of claim 1, wherein
each of the ribs is configured by folding the sheet member such that the portions of the other surface of the sheet member come into contact with each other, and
the method further comprises,
joining the portions of the other surface of the sheet member by welding in the position where each of the ribs is formed, the portions of the other surface of the sheet member being in contact with each other.

8. The method for manufacturing the grid-stiffened structure of claim 1, wherein
each of the ribs is formed by folding the sheet member so as to have a round-shaped top portion.

9. The method for manufacturing the grid-stiffened structure of claim 8, further comprising
upon folding each of the rib configuring regions, sandwiching between the portions of the sheet member a member whose cross section is circular.

10. The method for manufacturing the grid-stiffened structure of claim 1, wherein
in the sheet member, the cells are triangular, the configuring regions set in the sheet member include rib configuring regions which extend in a first direction, rib configuring regions which extend in a second direction, and rib configuring regions which extend in a third direction, and
a position where each of the rib configuring regions extending in the first direction and each of the rib configuring regions extending in the second direction intersect, a position where each of the rib configuring regions extending in the second direction and each of the rib configuring regions extending in the third direction intersect, and a position where each of the rib configuring regions extending in the third direction and each of the rib configuring regions extending in the first direction intersect are shifted from one another.

11. The method for manufacturing the grid-stiffened structure of claim 1, wherein
the sheet member is a plate member subjected to plastic working.

12. The method for manufacturing the grid-stiffened structure of claim 11, wherein
the sheet member is made of a fiber-reinforced thermoplastic resin composite material.

13. The method for manufacturing the grid-stiffened structure of claim 11, wherein
the sheet member is made of a fiber-reinforced thermosetting resin composite material.

14. A method for manufacturing a grid-stiffened structure having triangular or quadrangular lattice-like ribs provided integrally with one surface of an outer panel, the method comprising:
regularly arranging triangular or quadrangular cells on one surface of a sheet member constituting the outer panel, and setting a lattice-like pattern provided with rib configuring regions for configuring the ribs, each of the rib configuring regions being configured between the cells;
providing through-holes in positions where the rib configuring regions of the sheet member intersect, wherein the through-holes separate the rib configuring regions;
forming the ribs protruding from the one surface of the sheet member by folding the rib configuring regions of the sheet member; and
mutually connecting ends of the ribs in a position of each of the through-holes, wherein
each of the ribs is formed by folding the sheet member so as to have an inverted U-shaped cross section.

15. A method for manufacturing a grid-stiffened structure having triangular or quadrangular lattice-like ribs provided integrally with one surface of an outer panel, the method comprising:
regularly arranging triangular or quadrangular cells on one surface of a sheet member constituting the outer panel, and setting a lattice-like pattern provided with rib configuring regions for configuring the ribs, each of the rib configuring regions being configured between the cells;
providing through-holes in positions where the rib configuring regions of the sheet member intersect, wherein the through-holes separate the rib configuring regions;
forming the ribs protruding from the one surface of the sheet member by folding the rib configuring regions of the sheet member; and
mutually connecting ends of the ribs in a position of each of the through-holes, wherein
each of the ribs is formed by folding the sheet member so as to have an inverted V-shaped cross section.

16. A method for manufacturing a grid-stiffened structure having triangular or quadrangular lattice-like ribs provided integrally with one surface of an outer panel, the method comprising:
regularly arranging triangular or quadrangular cells on one surface of a sheet member constituting the outer panel, and setting a lattice-like pattern provided with rib configuring regions for configuring the ribs, each of the rib configuring regions being configured between the cells;
providing through-holes in positions where the rib configuring regions of the sheet member intersect, wherein the through-holes separate the rib configuring regions;
forming the ribs protruding from the one surface of the sheet member by folding the rib configuring regions of the sheet member;
mutually connecting ends of the ribs in a position of each of the through-holes; and
whittling a top portion of each of the ribs.

17. A method for manufacturing a grid-stiffened structure having triangular or quadrangular lattice-like ribs provided integrally with one surface of an outer panel, the method comprising:
regularly arranging triangular or quadrangular cells on one surface of a sheet member constituting the outer panel, and setting a lattice-like pattern provided with rib configuring regions for configuring the ribs, each of the rib configuring regions being configured between the cells;

providing through-holes in positions where the rib configuring regions of the sheet member intersect, wherein the through-holes separate the rib configuring regions;

forming the ribs protruding from the one surface of the sheet member by folding the rib configuring regions of the sheet member; and mutually connecting ends of the ribs in a position of each of the through-holes, wherein the sheet member is a plate member formed of wires shaped into a net, wherein the wires are subjected to plastic working.

18. A grid-stiffened structure having triangular or quadrangular lattice-like ribs provided integrally with one surface of an outer panel, wherein the outer panel and the ribs are configured by one folded continuous sheet member, in the sheet member, through-holes are formed in positions where the ribs mutually intersect, the through-holes separating the ribs, when forming the ribs by folding the sheet member, extending parts protruding from the ends of the ribs toward a center of each of the through-holes are provided integrally with the ribs, and the ends of the extending parts are connected to be of a loop shape around the through-holes.

* * * * *